US011939911B2

(12) United States Patent
Orr et al.

(10) Patent No.: US 11,939,911 B2
(45) Date of Patent: Mar. 26, 2024

(54) CLUTCHED PULLEY ASSEMBLY

(71) Applicant: Litens Automotive Partnership, Woodbridge (CA)

(72) Inventors: Kody A. Orr, Etobicoke (CA); Geoffrey William Ryeland, North York (CA); Andrew Malcolm Boyes, Aurora (CA); Reza Farshidi, Toronto (CA); Christopher Nyholm, Newmarket (CA); Jun Xu, Woodbridge (CA); Ercong Ji, Scarborough (CA)

(73) Assignee: LITENS AUTOMOTIVE PARTNERSHIP, Woodbridge, CA (US)

( * ) Notice: Subject to any disclaimer, the term of this patent is extended or adjusted under 35 U.S.C. 154(b) by 228 days.

(21) Appl. No.: 17/595,117

(22) PCT Filed: May 6, 2020

(86) PCT No.: PCT/CA2020/050616
§ 371 (c)(1),
(2) Date: Nov. 9, 2021

(87) PCT Pub. No.: WO2020/227819
PCT Pub. Date: Nov. 19, 2020

(65) Prior Publication Data
US 2022/0220885 A1    Jul. 14, 2022

Related U.S. Application Data

(60) Provisional application No. 62/952,890, filed on Dec. 23, 2019, provisional application No. 62/846,217, filed on May 10, 2019.

(51) Int. Cl.
*F02B 67/06*    (2006.01)
*B60K 25/02*    (2006.01)
(Continued)

(52) U.S. Cl.
CPC ............. *F02B 67/06* (2013.01); *B60K 25/02* (2013.01); *F16H 55/36* (2013.01);
(Continued)

(58) Field of Classification Search
CPC .. F16H 2007/0865; F16H 55/36; F16D 11/10; F02B 2275/06; F02B 67/06; B60K 25/02
See application file for complete search history.

(56) References Cited

U.S. PATENT DOCUMENTS

2018/0162370 A1*   6/2018  Colavincenzo ....... B60W 20/40

FOREIGN PATENT DOCUMENTS

| WO | WO 2012139224 A1 | 10/2012 | |
| WO | WO 2013152430 A1 | 10/2013 | |
| WO | WO-2018109515 A1 * | 6/2018 | ............. B60K 25/02 |

OTHER PUBLICATIONS

International Search Report and Written Opinion from corresponding PCT Application No. PCT/CA2020/050616 dated Aug. 3, 2020.

* cited by examiner

*Primary Examiner* — Kevin A Lathers
(74) *Attorney, Agent, or Firm* — Aird & McBurney LP

(57) ABSTRACT

A clutched pulley assembly mountable to the shaft of a motor-generator unit (MGU) has a first sheave, with first spline teeth, rotatably mounted to the MGU shaft, and a second sheave, with second spline teeth, fixed to the MGU shaft. A slider gear with slider gear spline teeth is axially moveable between a torque transfer position, where the slider gear spline teeth simultaneously intermesh with the spline teeth of the first and second sheaves to operatively connect the sheaves to each other, and a torque cut-off position, where the slider gear spline teeth intermesh with the second sheave spline teeth but not the first sheave spline teeth so as to operatively disconnect the sheaves. An actuator drives the slider gear between the torque transfer and cut-off (Continued)

positions. The pulley assembly can be used in a stand-cooling mode wherein the engine is stopped but the MGU powers a load.

15 Claims, 20 Drawing Sheets

(51) Int. Cl.
 *F16D 11/10* (2006.01)
 *F16H 7/08* (2006.01)
 *F16H 55/36* (2006.01)
(52) U.S. Cl.
 CPC ........... *F02B 2275/06* (2013.01); *F16D 11/10* (2013.01); *F16H 2007/0865* (2013.01)

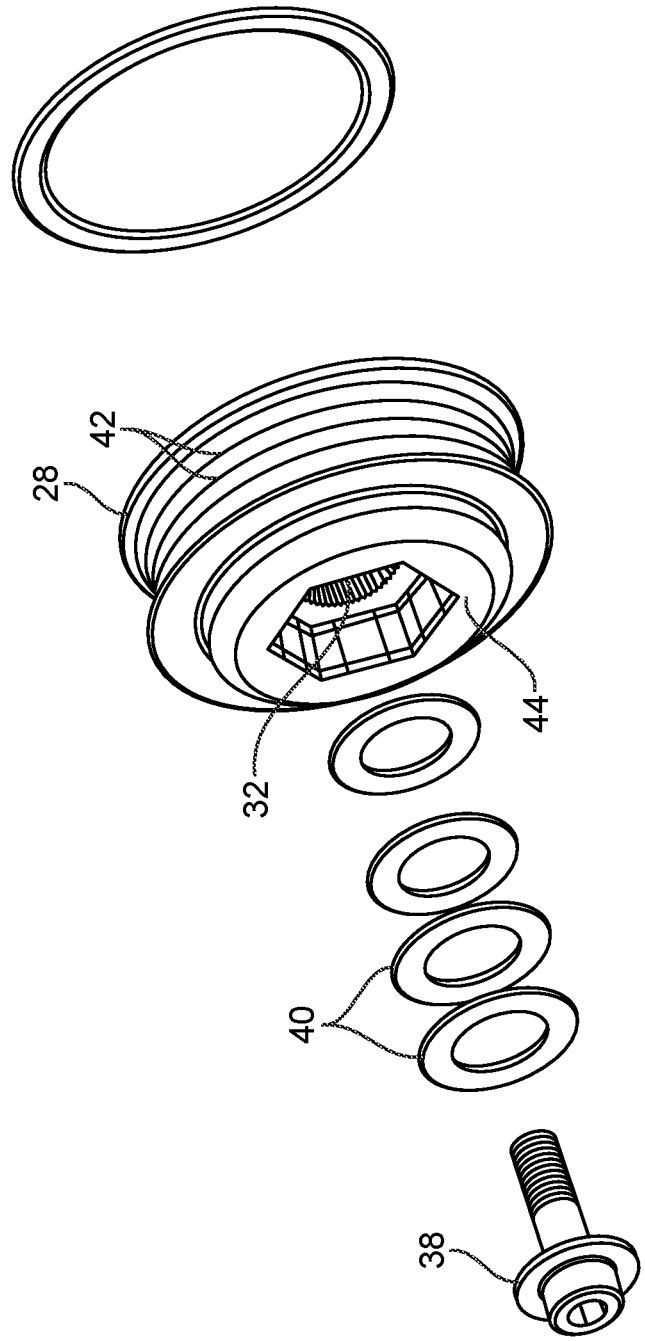

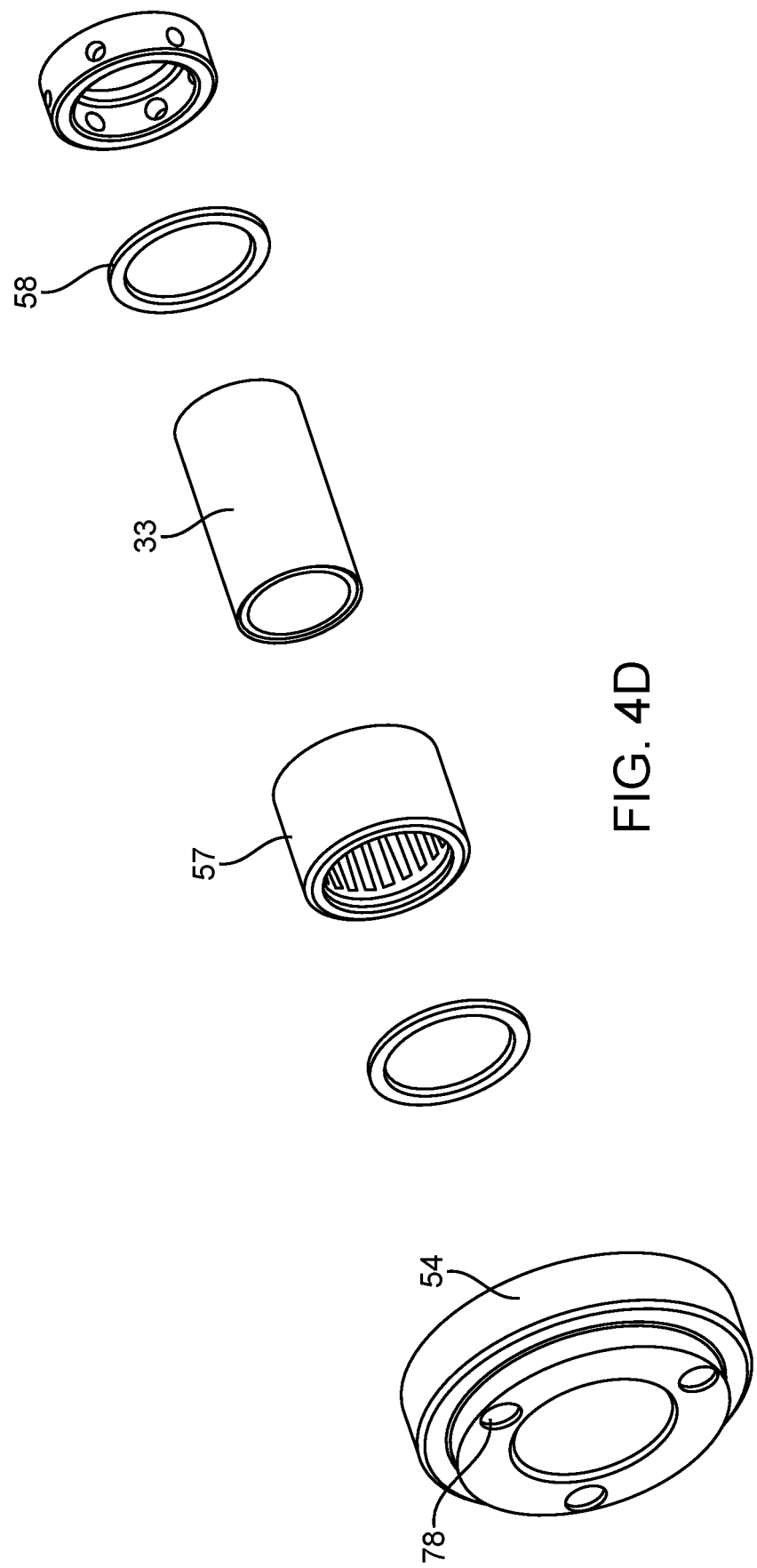

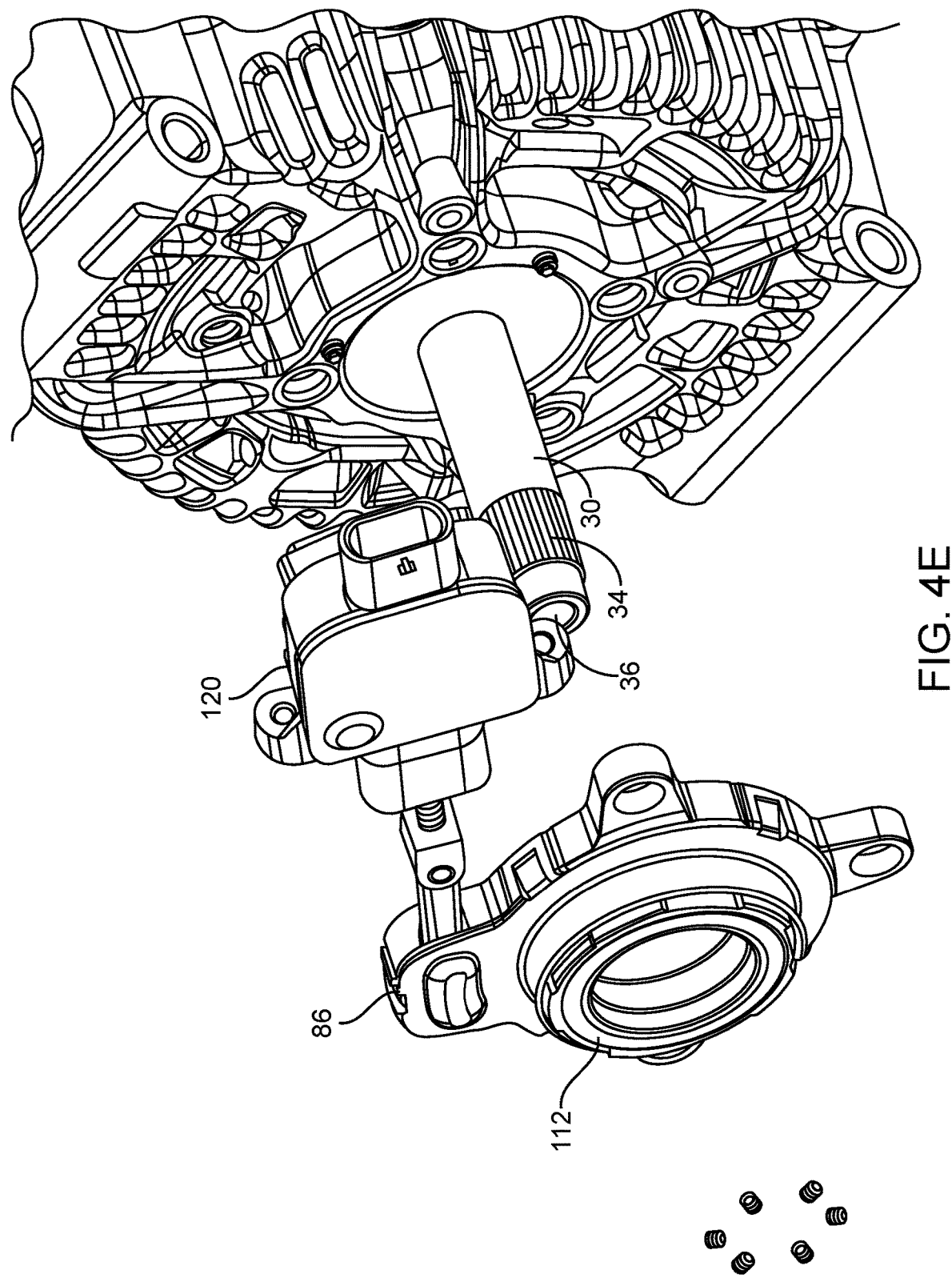

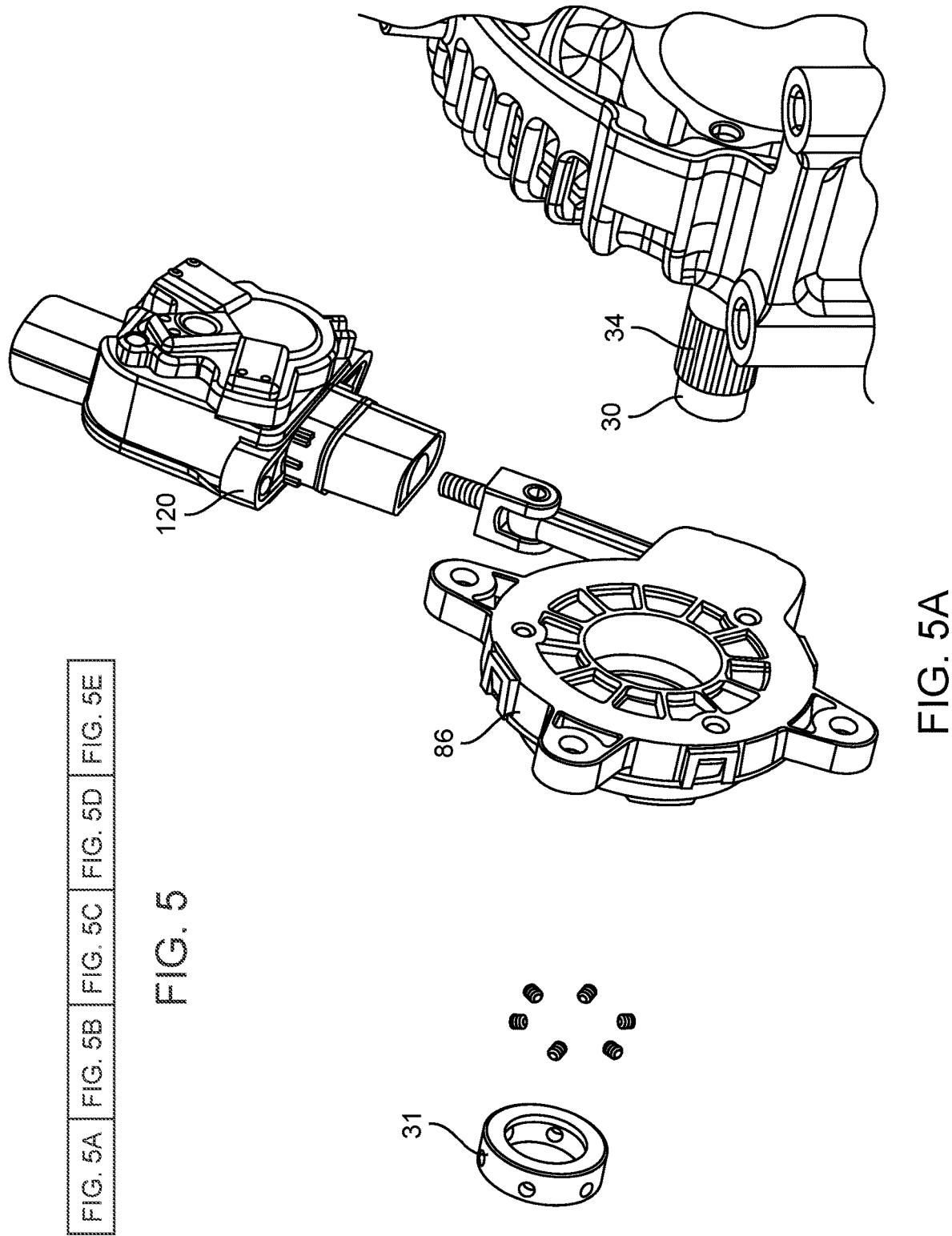

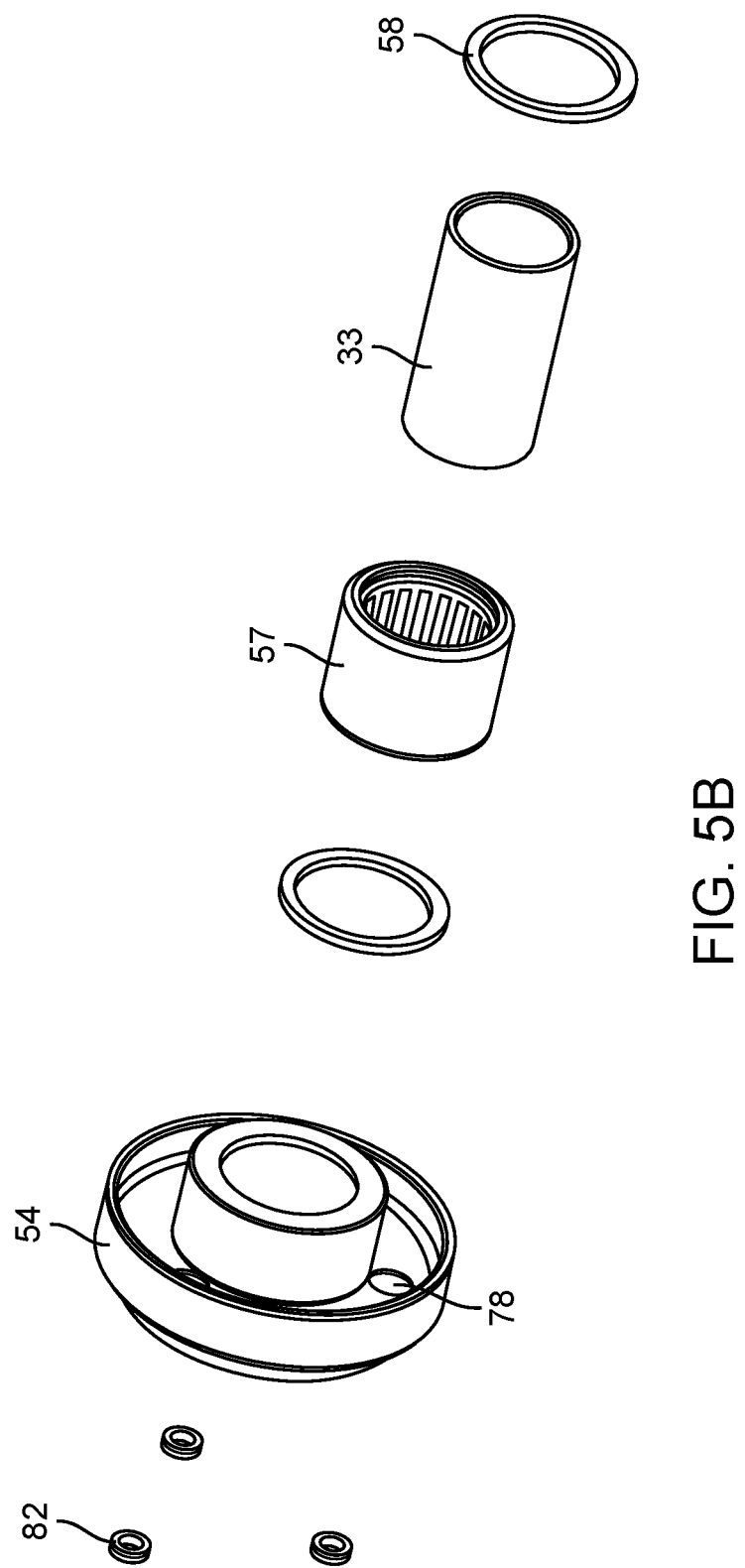

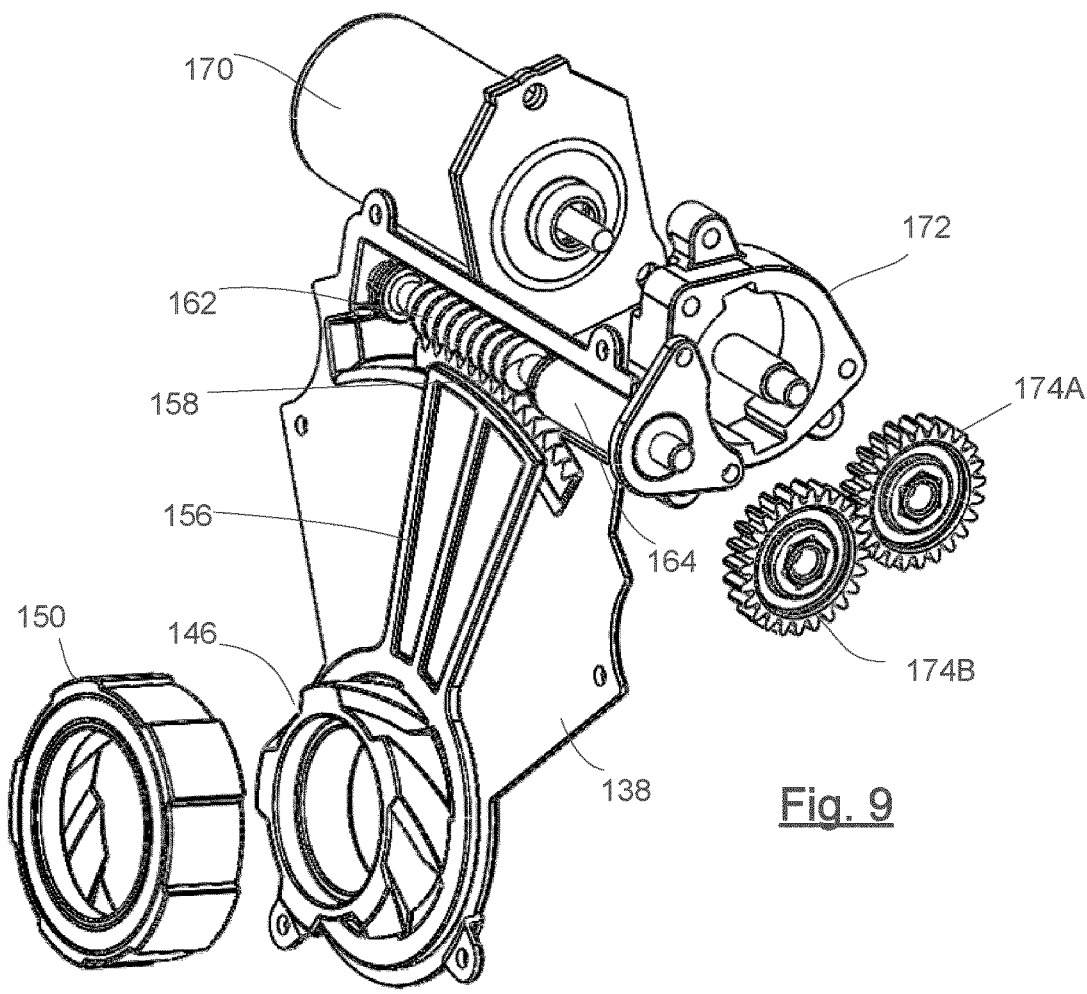
Fig. 9
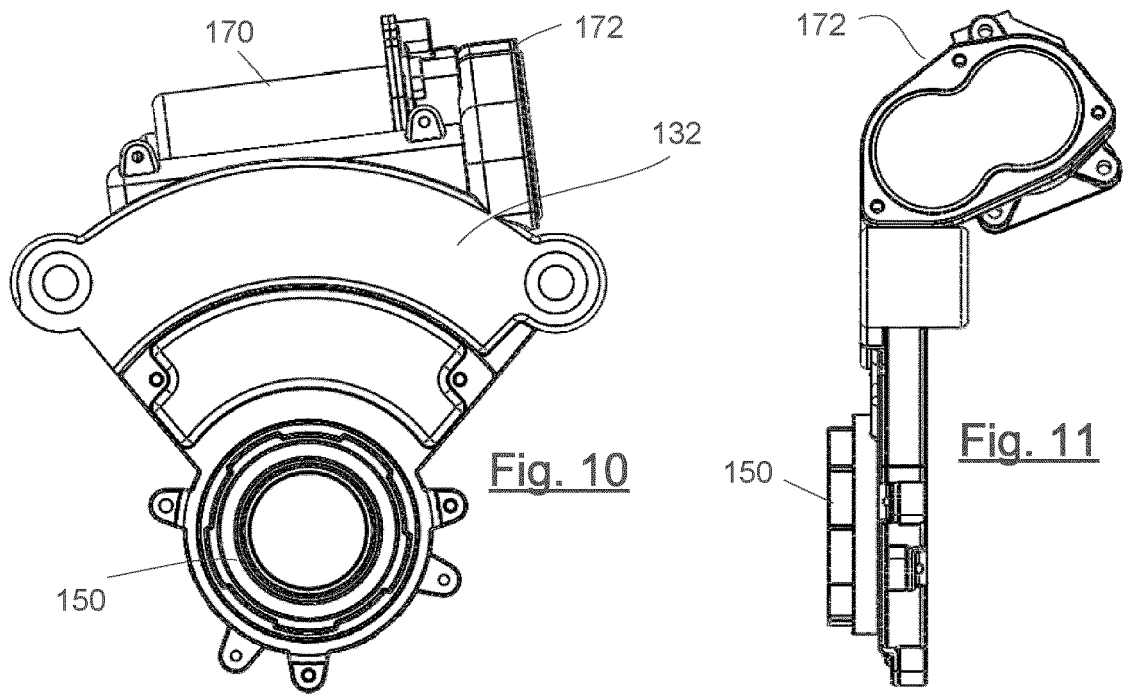
Fig. 10
Fig. 11

CLUTCHED PULLEY ASSEMBLY

CROSS-REFERENCE TO RELATED APPLICATIONS

This application is a national phase entry of PCT/CA2020/050616 filed May 6, 2020, which claims the benefit of U.S. provisional application No. 62/846,217 filed May 10, 2019, and to U.S. provisional application No. 62/952,890, filed Dec. 23, 2019, the contents of both of which are incorporated herein by reference in their entirety.

BACKGROUND

Some mild hybrid vehicles increase fuel efficiency by shutting off the internal combustion engine when the vehicle comes to a standstill, for example, when stopped at a traffic light. In such vehicles a motor-generator unit (MGU) employed in the engine accessory drive system can be used use to restart the engine. The problem with such systems is that the air conditioning compressor or other accessory drive system load is also shut down while the engine is off, which then necessitates a trade-off between passenger comfort and fuel efficiency. It is possible to avoid this problem by using electrically powered air conditioning compressors or other such electrically powered loads, but such devices require an additional electric motor and inverter which adds considerable cost and complexity. It would be beneficial to have an accessory drive system where the engine powers a conventional mechanical air conditioning compressor most of the time, but when the engine turns off, the MGU powers the conventional mechanical air conditioning compressor or other such load. This could be achieved by a clutched pulley or pulley assembly.

There are also other potential applications for a clutched pulley or pulley assembly in an accessory drive system or other endless drive systems where it is desired to selectively or dynamically power (or not power) the accessories or other loads.

A clutched pulley or pulley assembly for an accessory drive system is thus desired.

SUMMARY

In a first aspect, a pulley assembly is provided for an accessory drive system of an internal combustion engine. The pulley assembly includes a first rotary drive member, a second rotary drive member, a slider gear, and an actuator. The first rotary drive member is configured to be rotatably supported on a shaft of a rotary power device, such as the shaft of a motor-generator unit (MGU) or crankshaft. The first rotary drive member is rotatable about a rotational axis, the rotation being independent of the rotation of the shaft when the first rotary drive member mounted thereon. The first rotary drive member, which may be a sheave, has a first set of spline teeth thereon. The second rotary drive member is configured to be fixed to the shaft so as to rotate therewith about the rotational axis when fixed on the shaft. The second rotary drive member, which may also be a sheave, has a second set of spline teeth thereon. The slider gear is disposed for rotation about the rotational axis, and includes a set of slider gear spline teeth thereon. The slider gear is axially moveable between a torque cut-off position and a torque transfer position. In the torque cut-off position the slider gear spline teeth intermesh with the spline teeth of one of the first and second rotary drive members but not the other of the first and second rotary drive members, thereby operatively disconnecting the first and second rotary drive members from each other. In the torque transfer position the slider gear spline teeth simultaneously intermesh with the spline teeth of both the first and second rotary drive members, thereby operatively connecting the first and second rotary drive member to each other. The actuator, which is mountable to the rotary power device, is connected to the slider gear to drive the slider gear axially to between the torque transfer position and the torque cut-off position.

The first rotary drive member can be mounted on a bearing configured to be mounted to the shaft so that the first rotary drive member is independently rotatable relative to the shaft.

The slider gear can have at least one slider gear wedge member and the other of the first and second rotary drive members can have at least one wedge member that is shaped complimentarily to the shape of the slider gear wedge member so that movement of the slider gear to the torque transfer position brings the at least one slider gear wedge member into sliding engagement with the at least one wedge member of the other of the first and second rotary drive members, and in the process of such engagement, a first side of the slider gear spline teeth becomes wedged against a first side of the spline teeth of the other of the first and second rotary drive members. This structure aids in reducing the noise while engaged.

The actuator can include a bias spring for urging the slider gear towards the torque transfer position.

The actuator can include a plunger ring concentrically mounted about the shaft, wherein the plunger ring has at least one leg extending in an axial direction, and wherein the other of the first and second rotary drive members includes at least one axial passageway in which the at least one leg is disposed. The plunger ring can thus be axially slidable relative to the other of the first and second rotary drive members so as to drivingly engage the slider gear. A driver screw can be concentrically mounted about the shaft for independent rotation relative to the shaft and a nut driver can be concentrically mounted about the shaft and operatively connected to the driver screw, the nut driver being constrained from rotation so as to translate axially when the driver screw rotates and engage the plunger ring. Various means are described for rotating the driver screw.

In a second aspect, an accessory drive system for an internal combustion engine is provided. The system includes a crankshaft pulley mounted to an engine crankshaft; a compressor pulley mounted to a compressor shaft; a pulley assembly mounted to a motor-generator unit (MGU) shaft; and first and second endless drive members. The pulley assembly includes: a first sheave rotatably mounted via a bearing to the MGU shaft so as to be rotatable independent of the MGU shaft, wherein the first sheave has a first set of spline teeth thereon; a second sheave fixed to the MGU shaft so as to rotate therewith, wherein the second sheave has a second set of spline teeth thereon; a slider gear disposed for rotation about the MGU shaft, wherein the slider gear has a set of slider gear spline teeth thereon and the slider gear is axially moveable between a torque cut-off position and a torque transfer position, wherein, in the torque cut-off position the slider gear spline teeth intermesh with the second sheave spline teeth but not the first sheave spline teeth, thereby operatively disconnecting the first and second sheaves from each other, and wherein, in the torque transfer position the slider gear spline teeth simultaneously intermesh with the second sheave spline teeth and the first sheave spline teeth, thereby operatively connecting the first and second sheaves to each other; and an actuator, mountable to an MGU, and connected to the slider gear to drive the slider gear axially between the torque transfer position and the torque cut-off position. The first endless drive member interconnects the crankshaft pulley and the first sheave and the second endless drive member interconnects the compressor pulley and the second sheave.

In the second aspect, the slider gear can have at least one slider gear wedge member and the first sheave can have at least one wedge member that is shaped complimentarily to the shape of the slider gear wedge member such that movement of the slider gear to the torque transfer position brings the at least one slider gear wedge member into sliding engagement with the at least one first sheave wedge member, and in the process of such engagement, a first side of the slider gear spline teeth becomes wedged against a first side of the first sheave spline teeth. This structure aids in reducing noise while engaged.

In the second aspect, the actuator can include: a bias spring for urging the slider gear towards the torque transfer position; a plunger ring concentrically mounted about the MGU shaft, the plunger ring including at least one leg extending in an axial direction, wherein the first sheave includes at least one axial passageway in which the at least one leg is disposed, the plunger ring being axially slidable relative to the first sheave so as to drivingly engage the slider gear; a driver screw concentrically mounted about the MGU shaft for independent rotation relative to the MGU shaft; a nut driver concentrically mounted about the MGU shaft and operatively connected to the driver screw, the nut driver being constrained from rotation so as to translate axially when the driver screw rotates and engage the plunger ring; and means for rotating the driver screw.

In the second aspect, the system can include a compressor and an MGU. The MGU can be operated at a rotational speed substantially equivalent to the rotational speed of the crankshaft immediately prior to changing the position of the slider gear, wherein equivalency should be understood taking into account different pulley ratios. Alternatively, the accessory drive system can be operated in a stand cooling mode in which the slider gear is positioned in the torque cut-off position, the engine is not operating and the crankshaft pulley is not rotating, and the MGU operates to power the compressor via the second endless drive member. Alternatively, the accessory drive system can be operated in an enhanced cooling mode in which the engine is operating at idle and the crankshaft pulley is rotating at idle speed, the slider gear is positioned in the torque cut-off position, and the MGU operates to power the compressor via the second endless drive member at a higher rotational speed that would have been available if the engine was powering the compressor.

In a third aspect, an accessory drive system for an internal combustion engine is provided. The accessory drive system includes an MGU pulley mounted to the shaft of a motor-generator (MGU) unit; a compressor pulley mounted to a compressor shaft; a pulley assembly mounted to a crankshaft of an engine; and a endless drive member. The pulley assembly includes: a sheave rotatably mounted via a bearing to the crankshaft so as to be rotatable independent of the crankshaft, the sheave having a first set of spline teeth thereon; a rotary drive member fixed to the crankshaft so as to rotate therewith, wherein the rotary drive member has a second set of spline teeth thereon; a slider gear disposed for rotation about the crankshaft, wherein the slider gear has a set of slider gear spline teeth thereon and the slider gear is axially moveable between a torque cut-off position and a torque transfer position, wherein, in the torque cut-off position the slider gear spline teeth intermesh with the rotary drive member spline teeth but not the sheave spline teeth, thereby operatively disconnecting the sheave and the rotary drive member from each other, and wherein, in the torque transfer position the slider gear spline teeth simultaneously intermesh with the rotary drive member spline teeth and the sheave spline teeth, thereby operatively connecting the rotary drive member and the sheave to each other, and an actuator connected to the slider gear to drive the slider gear axially between the torque transfer position and the torque cut-off position. The endless drive member interconnects the sheave, the MGU pulley and the compressor pulley.

In the third aspect, the slider gear can have at least one slider gear wedge member and the sheave can have at least one wedge member that is shaped complimentarily to the shape of the slider gear wedge member such that movement of the slider gear to the torque transfer position brings the at least one slider gear wedge member into sliding engagement with the at least one sheave wedge member, and in the process of such engagement, a first side of the slider gear spline teeth becomes wedged against a first side of the sheave spline teeth. This structure aids in reducing noise while engaged.

In the third aspect, the actuator can include: a bias spring for urging the slider gear towards the torque transfer position; a plunger ring concentrically mounted about the crankshaft, the plunger ring including at least one leg extending in an axial direction, wherein the sheave includes at least one axial passageway in which the at least one leg is disposed, the plunger ring being axially slidable relative to the sheave so as to drivingly engage the slider gear; a driver screw concentrically mounted about the crankshaft for independent rotation relative to the crankshaft; a nut driver concentrically mounted about the crankshaft and operatively connected to the driver screw, the nut driver being constrained from rotation so as to translate axially when the driver screw rotates and engage the plunger ring; and means for rotating the driver screw.

The actuator of any of the $1^{st}$ to $3^{rd}$ aspects can include a rotary motor coupled to a worm gear, which drives a sector gear connected to the driver screw. The worm gear can be packaged underneath, as opposed to inline with, the rotary motor such that a worm gear rotational axis lies parallel to the motor rotational axis. A gear box can be provided to facilitate such an axis-shifting arrangement. This actuator is able to provide rapid actuation of the slider gear and is advantageous from a packaging point of view.

BRIEF DESCRIPTION OF DRAWINGS

The foregoing and other aspects of the invention will be better understood with reference to the attached drawings, wherein:

FIG. 9 is a partial assembly view of the alternative actuator shown in FIG. 8;

FIG. 10 is a front view of the alternative actuator shown in FIG. 8;

FIG. 11 is a side view of the alternative actuator shown in FIG. 8;

FIGS. 13A and 13B are cross-sectional views of a crankshaft pulley assembly having an integrated clutch mechanism similar to that shown in FIGS. 3-5, wherein FIG. 13A depicts the integrated clutch mechanism in an engaged or torque transfer position and FIG. 13B depicts the integrated clutch mechanism in an disengaged or torque cut-off position.

DETAILED DESCRIPTION

Figure 1:
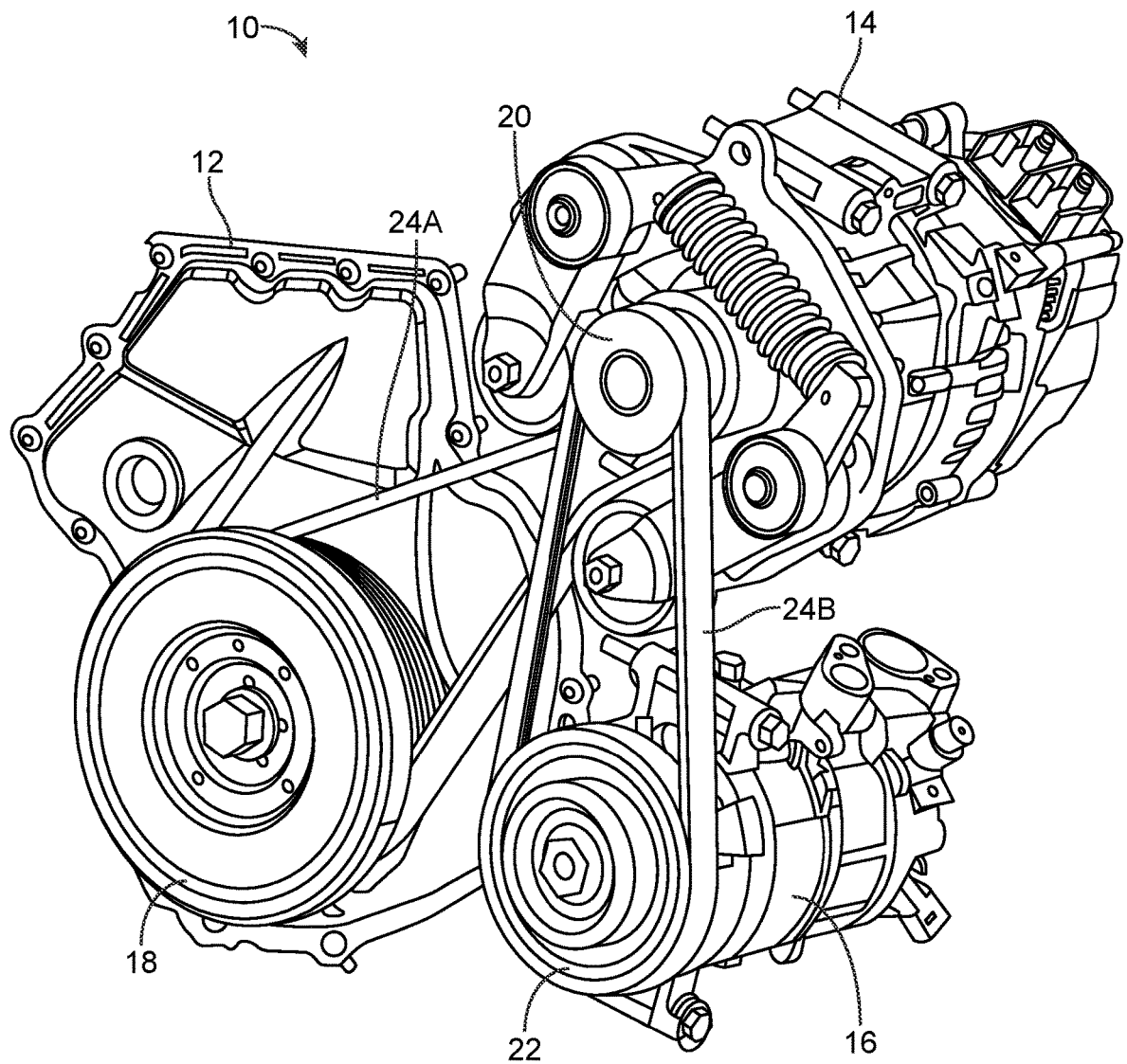
FIG. 1 is a perspective view of an accessory drive system for an internal combustion engine.

For simplicity and clarity of illustration, where considered appropriate, reference numerals may be repeated among the drawings to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the drawings and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

FIG. 1 shows an accessory drive system 10 for an internal combustion engine (or "ICE"), partially shown at reference numeral 12. The system 10 includes the ICE 12, a motor-generator unit (or "MGU") 14 (alternatively referred to as a belt starter-generator or "BSG"), and at least one accessory such as an air conditioning compressor ("AC") unit 16. Each of these elements 12, 14, 16 includes a rotary drive member: the ICE 12 features a crankshaft (or "CS") pulley 18 that receives (or delivers) rotational power from (to) the ICE 12; the MGU 14 includes an MGU pulley assembly 20 that is drivingly connected to an internal MGU shaft 30 (see FIGS. 3-5); and the AC unit 16 includes an AC pulley 22 that is drivingly connected to an internal shaft of the AC unit 16 (not explicitly shown in FIG. 1). The CS pulley 18 and the MGU pulley assembly 20 are inter-connected via a first endless drive member such as poly-V belt 24A, and the MGU pulley assembly 20 and AC pulley 22 are inter-connected via a second endless drive member such as poly-V belt 24B.

Figure 2:
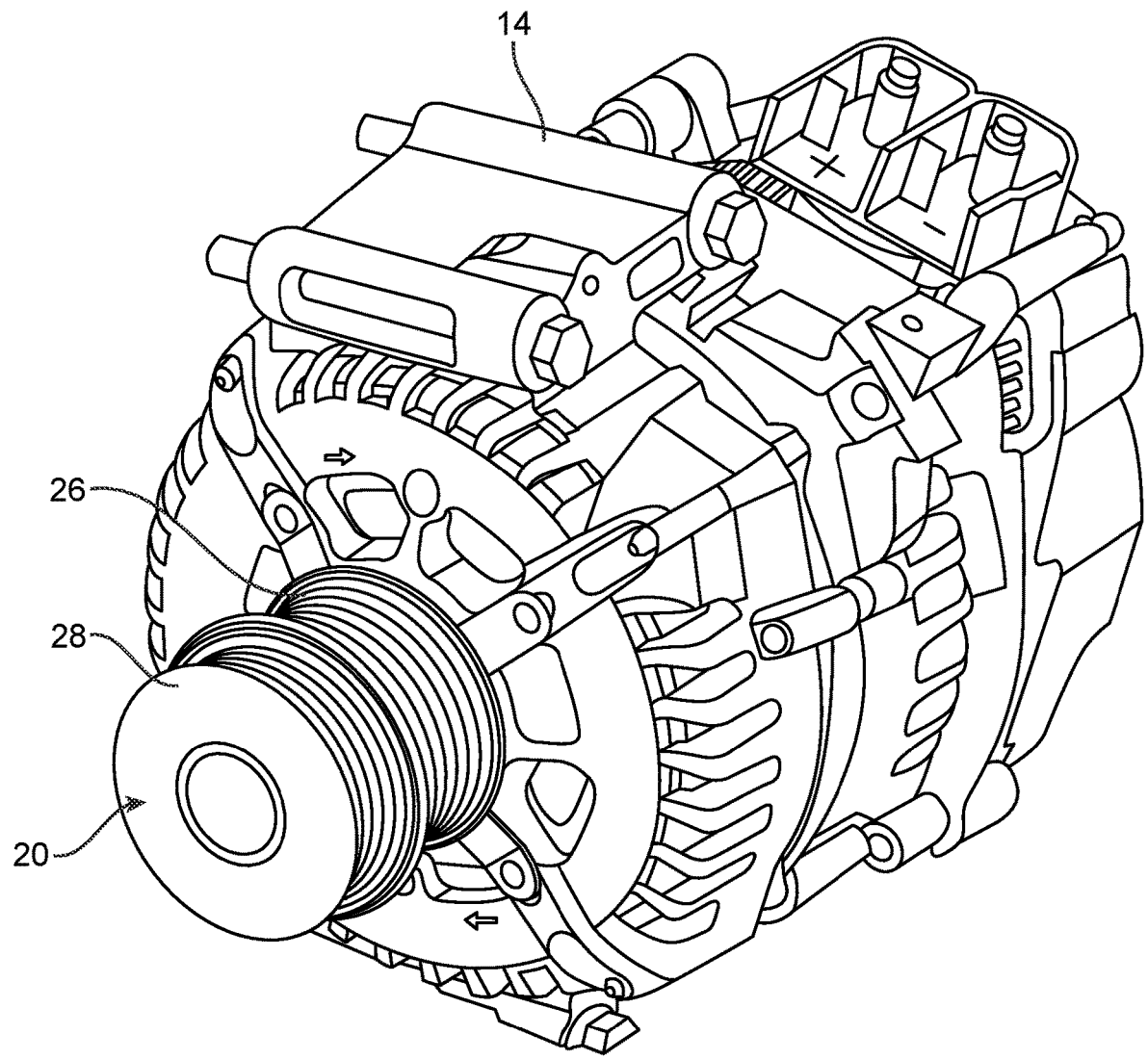
FIG. 2 is a perspective view of a motor-generator unit (MGU) employed in the accessory drive system shown in FIG. 1.

FIG. 2 shows the MGU 14 in isolation, with MGU pulley assembly 20 mounted on the MGU shaft. The MGU 14 per se is a conventional product. The MGU pulley assembly 20 is novel and features two pulley sheaves 26, 28 that can be selectively operatively connected or disconnected to/from one another via an integrated clutch mechanism discussed below. In the illustrated embodiment, the sheave 26 is connected to the CS pulley 18 via the belt 24A (and thus may be referred to herein as the "CS sheave") and the sheave 28 is connected to the at least one accessory such as the AC unit 16 via the belt 24B (and thus may be referred to herein as the "AC sheave"). In the illustrated embodiment the AC sheave 28 is fixed to the MGU shaft 30 (see FIGS. 3-5) and the CS sheave 26 is rotatably mounted, e.g. via a bearing, to the MGU shaft 30.

With such capability, the at least one accessory such as the AC unit 16 can be powered by either the ICE 12 or the MGU 14.

When the CS sheave 26 is operatively connected to the AC sheave 28, the belt 24A can transfer rotational power between the ICE CS pulley 18 and the CS sheave 26, which transfers rotational power via the integrated clutch mechanism to the AC sheave 28, which transfers rotational power via the belt 24B to the AC pulley 22 and the AC unit 16. In a hybrid vehicle which uses the accessory drive system 10 and the MGU 14 for multiple functions, this configuration can be used for:

- a 'normal' mode, wherein rotational power from the ICE 12 and CS pulley 18 is used to operate the MGU 14 as a generator to recharge a battery (not shown) and power the AC unit 16;
- a 'hybrid start' mode, wherein the ICE 12 is shut off and rotational power from the MGU 14 is used to turn the CS pulley 18 and start the ICE 12, in which case the AC unit 16 is powered by the MGU 14;
- a 'boost' mode, wherein rotational power from the MGU 14 is used to turn the CS pulley 18 to increase torque on the ICE crankshaft in order to assist in driving the vehicle, in which case the AC unit 16 is powered by the MGU 14; and/or
- a 'regen' mode, wherein, rotational power from the CS pulley 18 arising from vehicle momentum is used to operate the MGU 14 as a generator to recharge a battery (not shown) and power the AC unit 16.

When the CS sheave 26 is operatively disconnected from the AC sheave 28, the CS sheave 26 freewheels in that it is operatively disconnected from the MGU 14. This configuration is particularly useful for a 'stand-cooling' mode, wherein the vehicle is at a standstill with the ICE 12 shut off but the at least one accessory such as the AC unit 16 is powered by the MGU 14. This allows the vehicle to, for example, continue to keep providing passenger comfort with mechanically driven components that are less expensive than electrically driven accessories such as electric AC compressors. It should also be appreciated that if the CS sheave 26 is operatively disconnected from the AC sheave 28, the vehicle may also be operated in an 'enhanced cooling' mode wherein the ICE 12 runs at idle but the AC unit 16 is powered by the MGU 14 at rotational speeds higher than would be available if the AC unit 16 was powered by the CS sheave 26 when the ICE 12 is at idle.

Figure 5C:
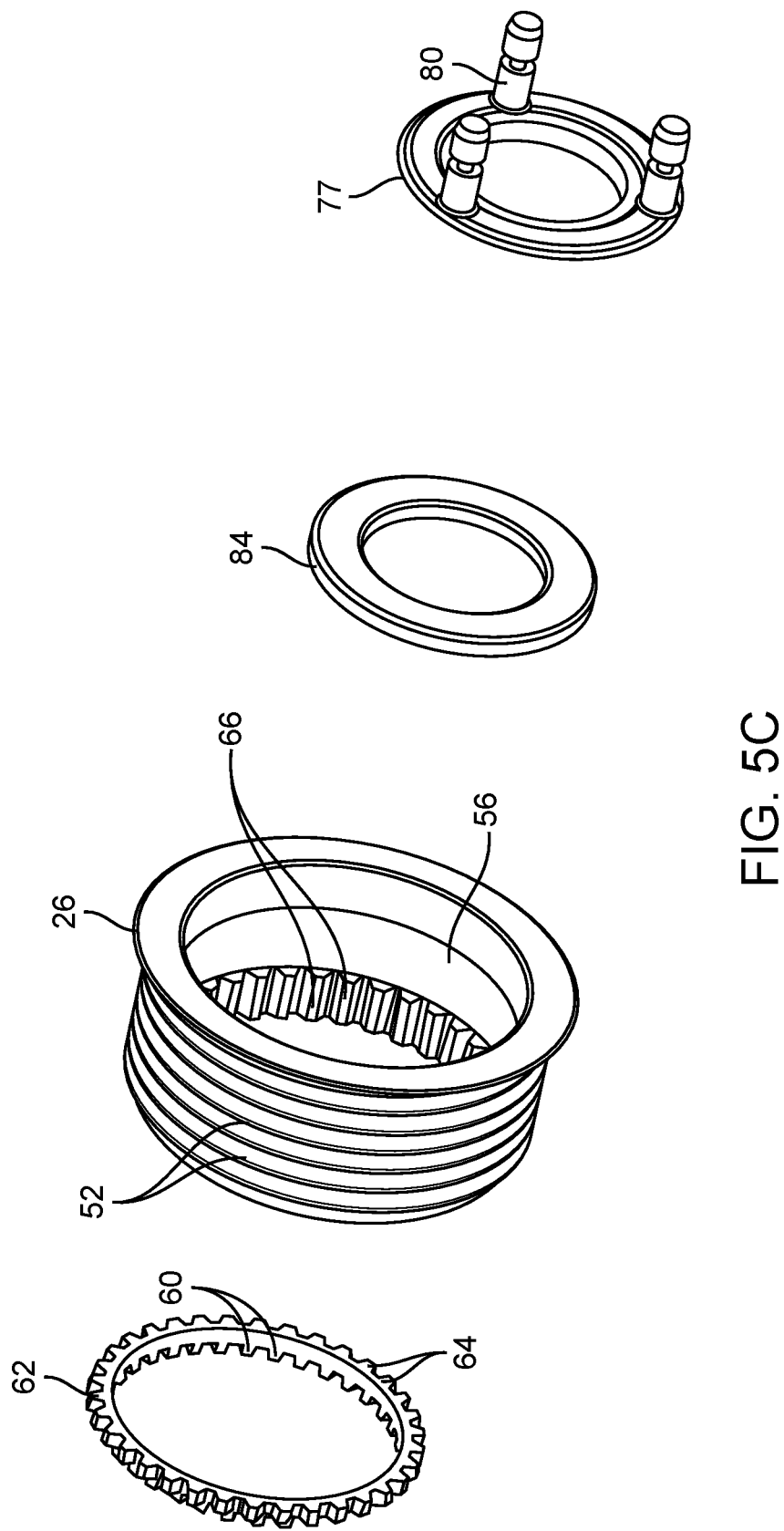
FIG. 5 (comprising FIGS. 5A-5E) is an exploded view of the MGU pulley assembly taken from a viewpoint opposite to the viewpoint shown in FIG. 4.
Figure 5D:
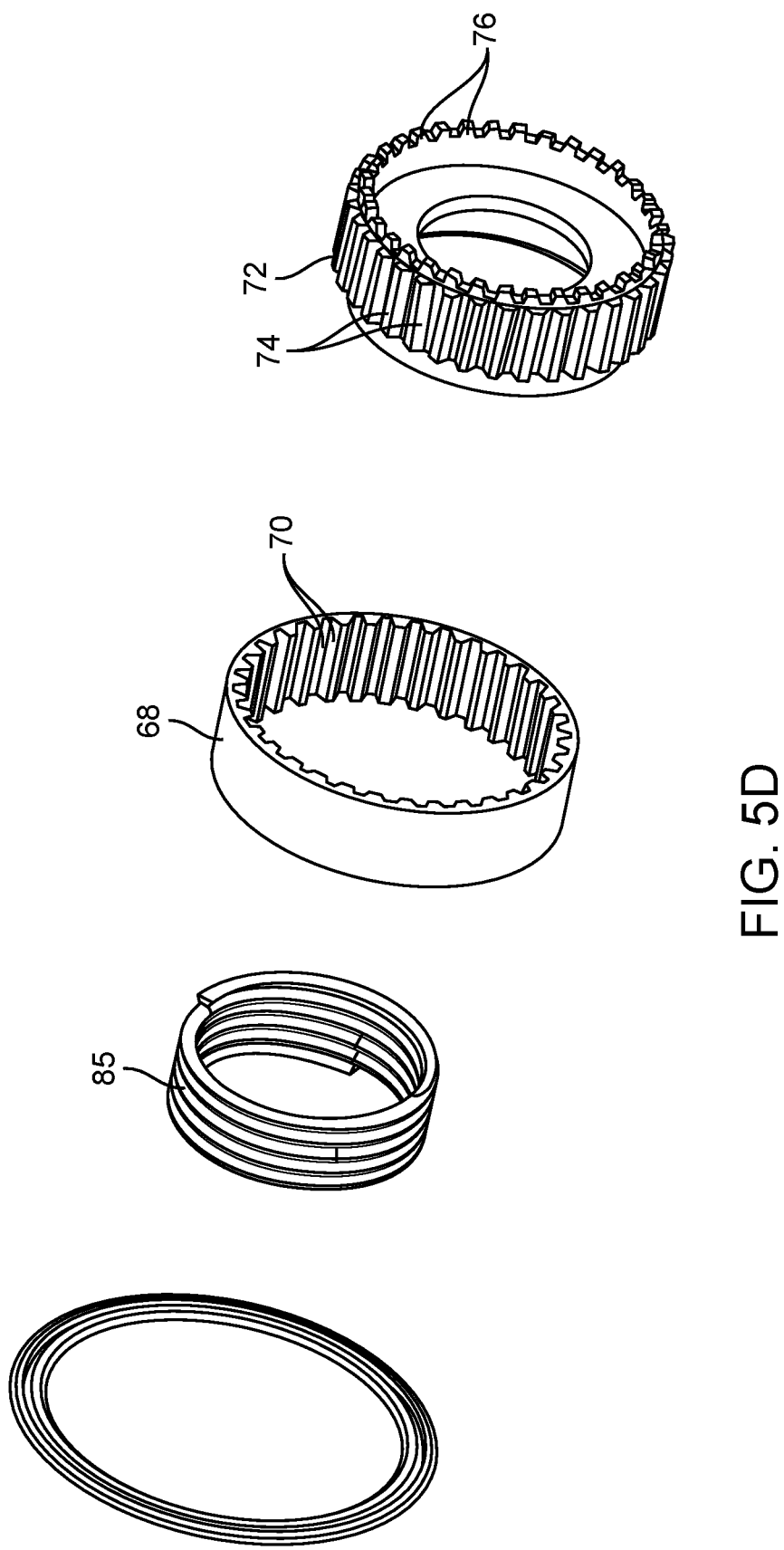
Figure 5E:
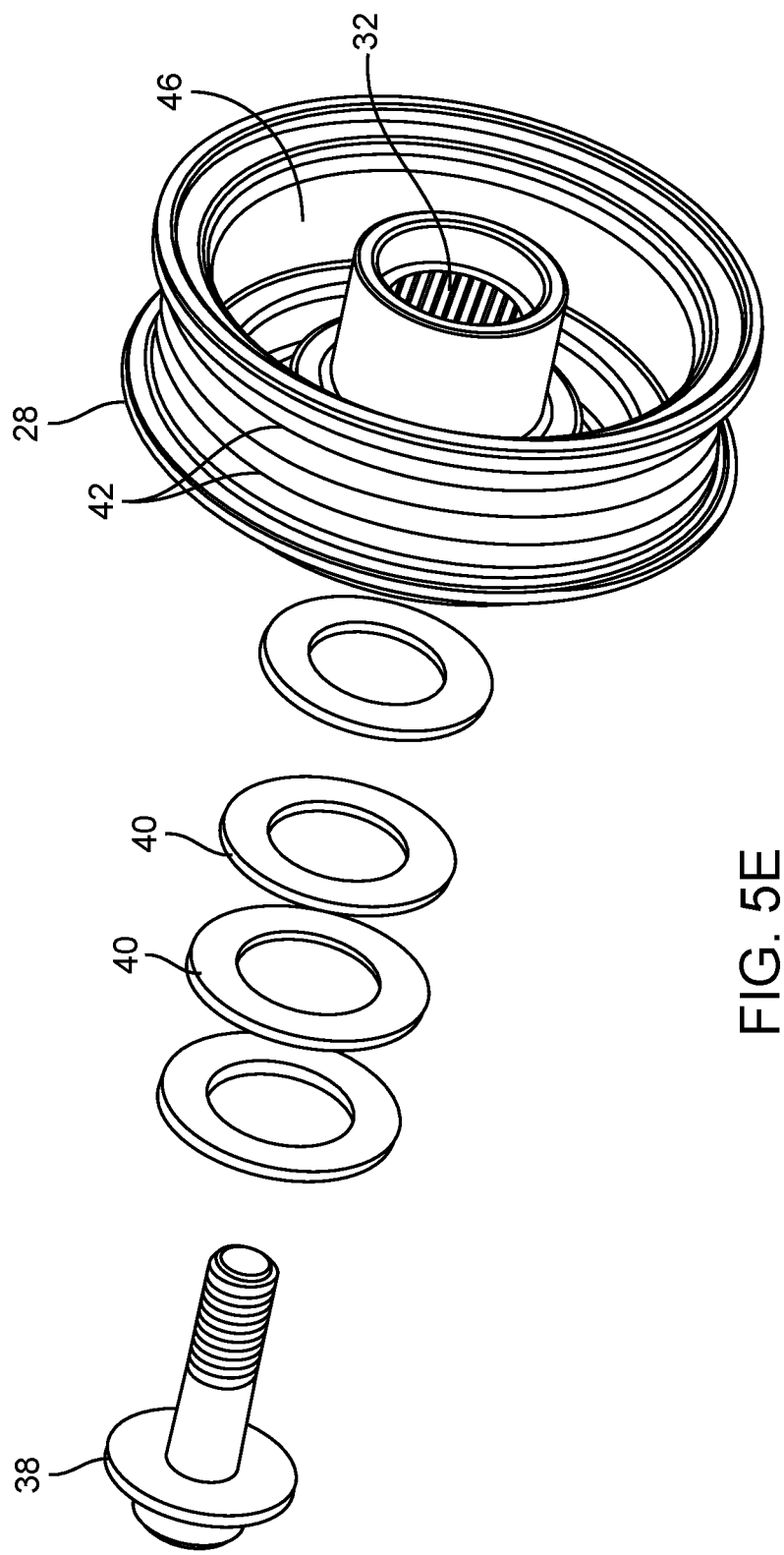

Referring additionally to the cross-sectional and exploded views of the MGU pulley assembly 20 in FIGS. 3, 4 and 5, the MGU internal shaft 30 is an integral part of the MGU 14. The AC sheave 28 is fixedly mounted to the MGU shaft 30. One structure for such mounting is shown in the illustrated embodiment wherein the AC sheave 28 has a toothed internal bore 32 that mates with a complimentarily toothed circumference 34 of the MGU shaft 30 to fix the two components together. A collar 31 can be fitted about an opposing end of the MGU shaft 30 and a liner or sleeve 33, which provides a bearing surface as described in greater detail below, can be fitted over the MGU shaft 30 to locate the bore 32 on the MGU shaft 30. The sleeve 33 can be press-fit into the bore 32. The MGU shaft 30 can include a threaded bore 36 which receives a lock nut 38 for fastening the AC sheave 28 to the MGU shaft 30, with washers 40 provided for load distribution. The collar 31, sleeve 33, toothed bore 32, toothed circumference 34, threaded bore 36, and lock nut 38 enable the MGU pulley assembly 20 to be unitarily mounted to the MGU shaft 30.

Alternative mounting structures are also possible. For example, the AC sheave 28 can be press fit directly onto the MGU shaft 30. Also, instead of the sleeve 33, a bearing can be press fit directly onto the MGU shaft 30 to journal the CS sheave 26 thereon.

The AC sheave 28 includes a circumferential power transfer surface such as provided by V-shaped grooves 42 that engage the poly-V belt 24B. The AC sheave 28 also includes a radially orientated wall 44 disposed between the circumferential power transfer surface and circumferential wall defining the bore 32 such that, generally speaking, the AC sheave 28 defines an axially-orientated toroidal space 46 in which clutch components are disposed.

The CS sheave 26 includes a circumferential power transfer surface, such as provided by V-shaped grooves 52 that engage the poly-V belt 24A. The CS sheave 26 includes a shaft or hub portion 54 that is rotatably mounted on the MGU shaft 30 via, for example, a needle roller bearing 57 which, in turn, is mounted on the shaft sleeve 33. If desired the shaft sleeve can function as one of the roller bearing races. The hub portion 54 can be produced as a separate piece and fixed, e.g., by press fit, to a cylindrical body 56 featuring the circumferential power transfer surface or alternatively integrated with the cylindrical body 56. A thrust washer 58 can be disposed axially between the hub portion 54 and the collar 31.

The CS sheave 26 includes a series of circumferentially spaced, axially projecting, dog teeth 60. The dog teeth 60 can be formed on an interior or axial edge wall of the cylindrical body 56. Alternatively, as shown in the illustrated embodiment, the dog teeth 60 can be formed on an axial edge of a separately-produced wedge ring 62 (seen best in FIGS. 4 & 5) that also has an exterior wall with a series of circumferentially spaced, radially-outward projecting teeth 64 formed therein that are fixedly wedged into a complimentarily-shaped series of circumferentially spaced, axially orientated, radially-inward projecting splines 66 extending from an interior circumferential wall of the cylindrical body 56.

The AC sheave 28 includes a series of circumferentially spaced, axially orientated, radially-inward projecting splines 70 formed on an interior wall thereof. The splines 70 can be formed unitarily in the AC sheave 28 or, as shown in the illustrated embodiment, the splines can be provided on an interior circumferential wall of a separately manufactured spline ring 68 that is fixed, e.g., by press fit, to the AC sheave 28.

A slider gear 72 is interposed between the AC sheave 28 and CS sheave 26 in order to operatively connect or disconnect the sheaves 26, 28. The slider gear 72 has an exterior circumferential wall on which a series of circumferentially spaced, axially orientated, radially-outward projecting splines 74 are formed. The splines 74 are shaped to complement the shape of the AC sheave splines 70 as well as the CS sheave splines 66, with sufficient interstitial space between the complimentary splines to enable the slider gear 72 to slide axially relative to the AC sheave 28 and the CS sheave 26. The slider gear 72 also includes an axial edge wall on which a series of circumferentially spaced, axially projecting dog teeth 76 are formed. These dog teeth 76 are shaped to complement the shape of the CS sheave dog teeth 60.

Figure 3A:
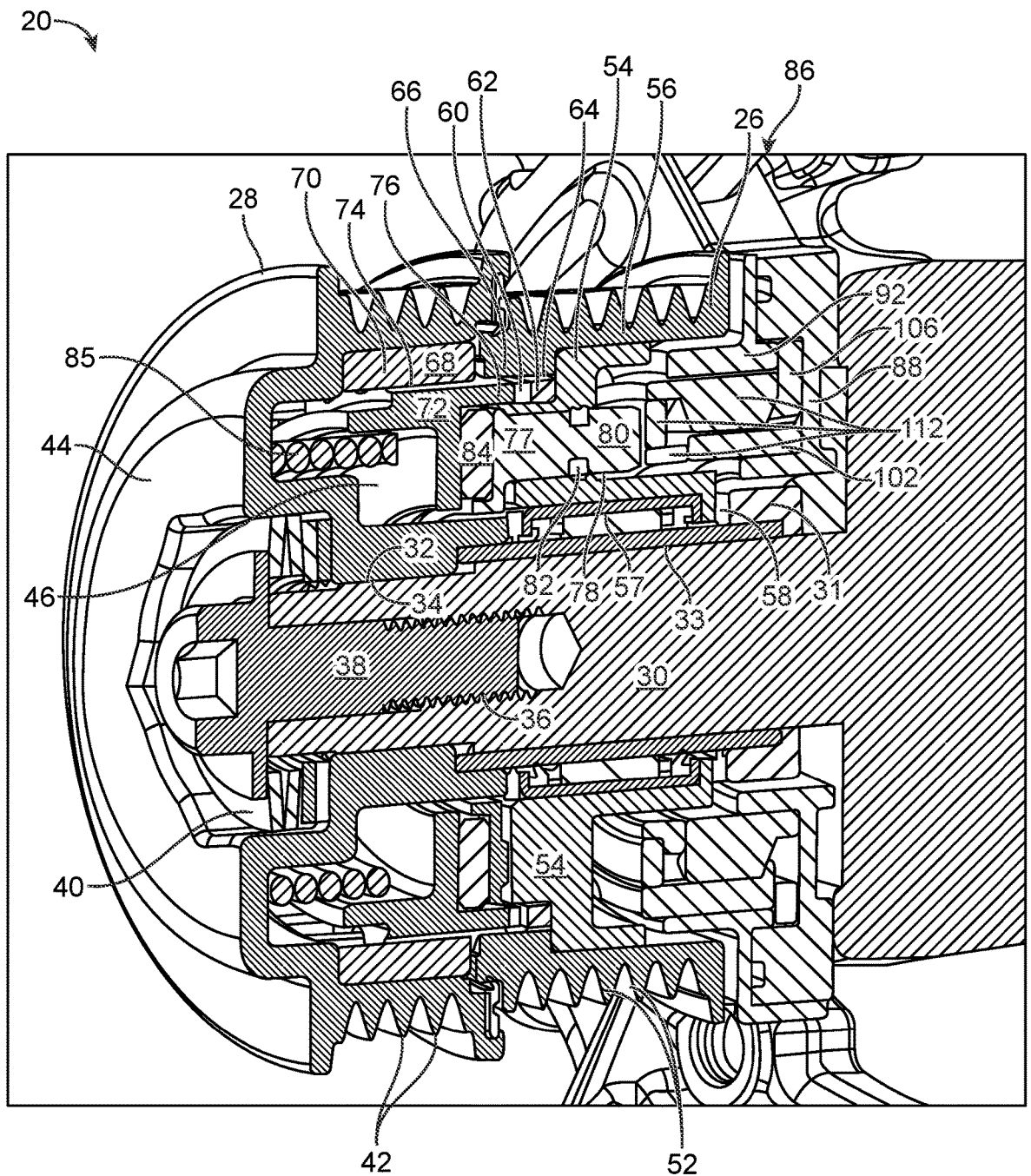
FIG. 3A is perspective cross-sectional view of an MGU pulley assembly having an integrated clutch mechanism, wherein the integrated clutch mechanism is shown in an engaged or torque transfer position.
Figure 3B:
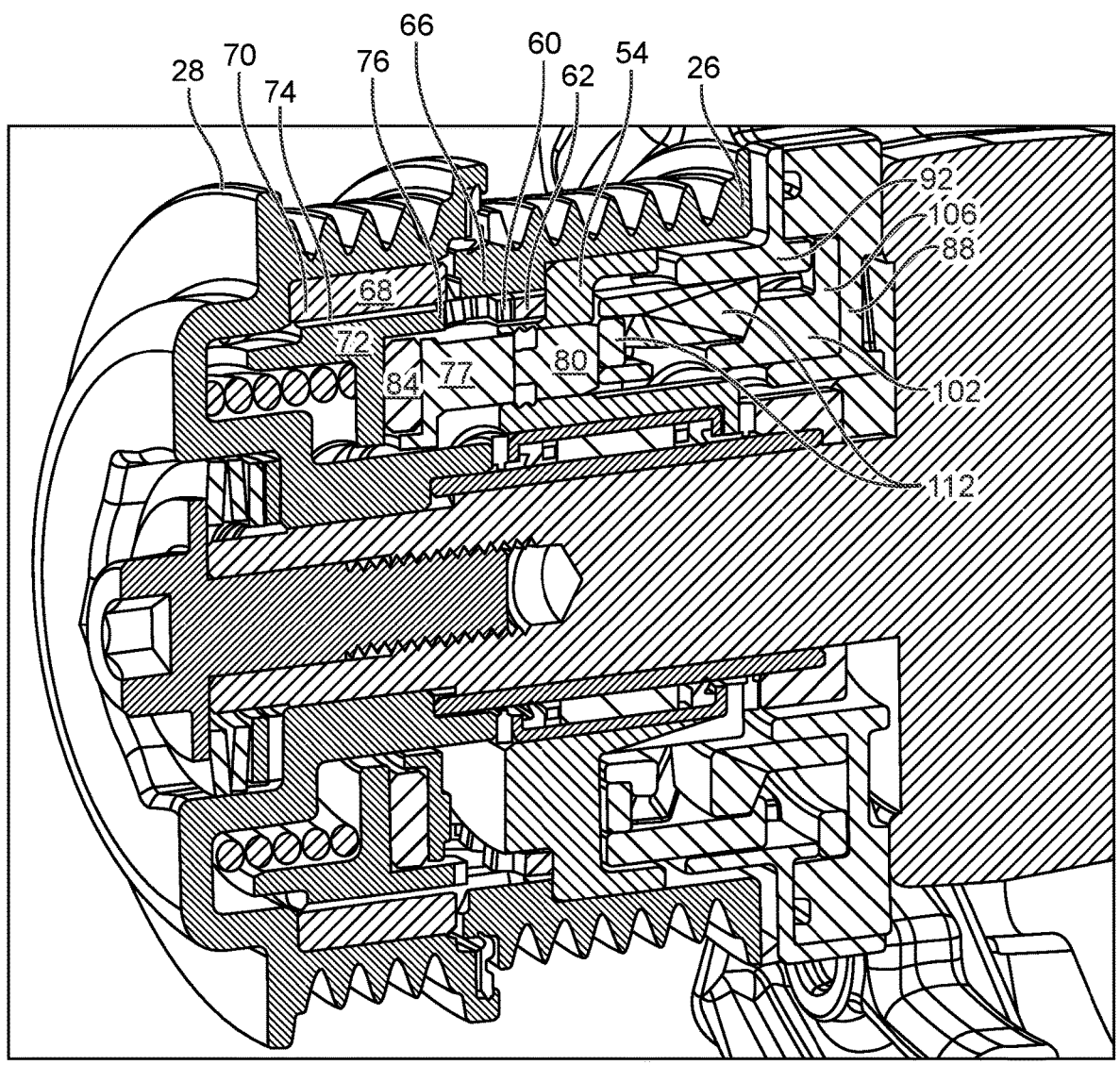
FIG. 3B is perspective cross-sectional view of the MGU pulley assembly, wherein the integrated clutch mechanism is shown in a disengaged or torque cut-off position.
Figure 4B:
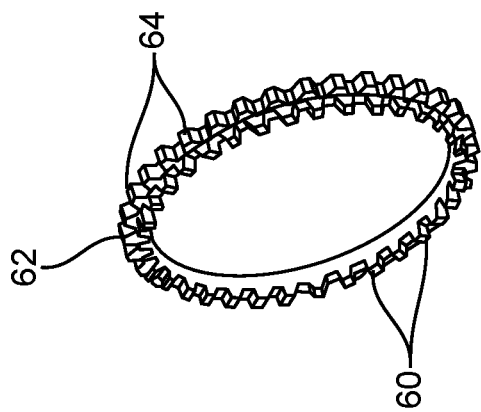
FIG. 4 (comprising FIGS. 4A-4E) is an exploded view of the MGU pulley assembly.
Figure 4B:
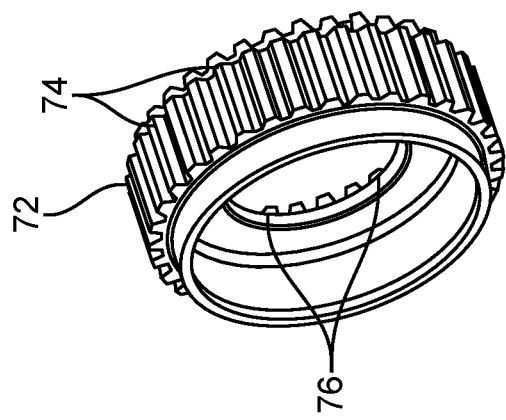
Figure 4B:
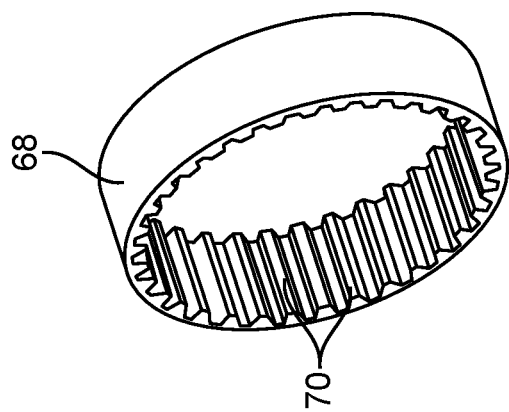
Figure 4B:
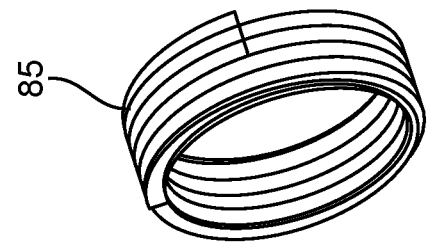
Figure 4C:
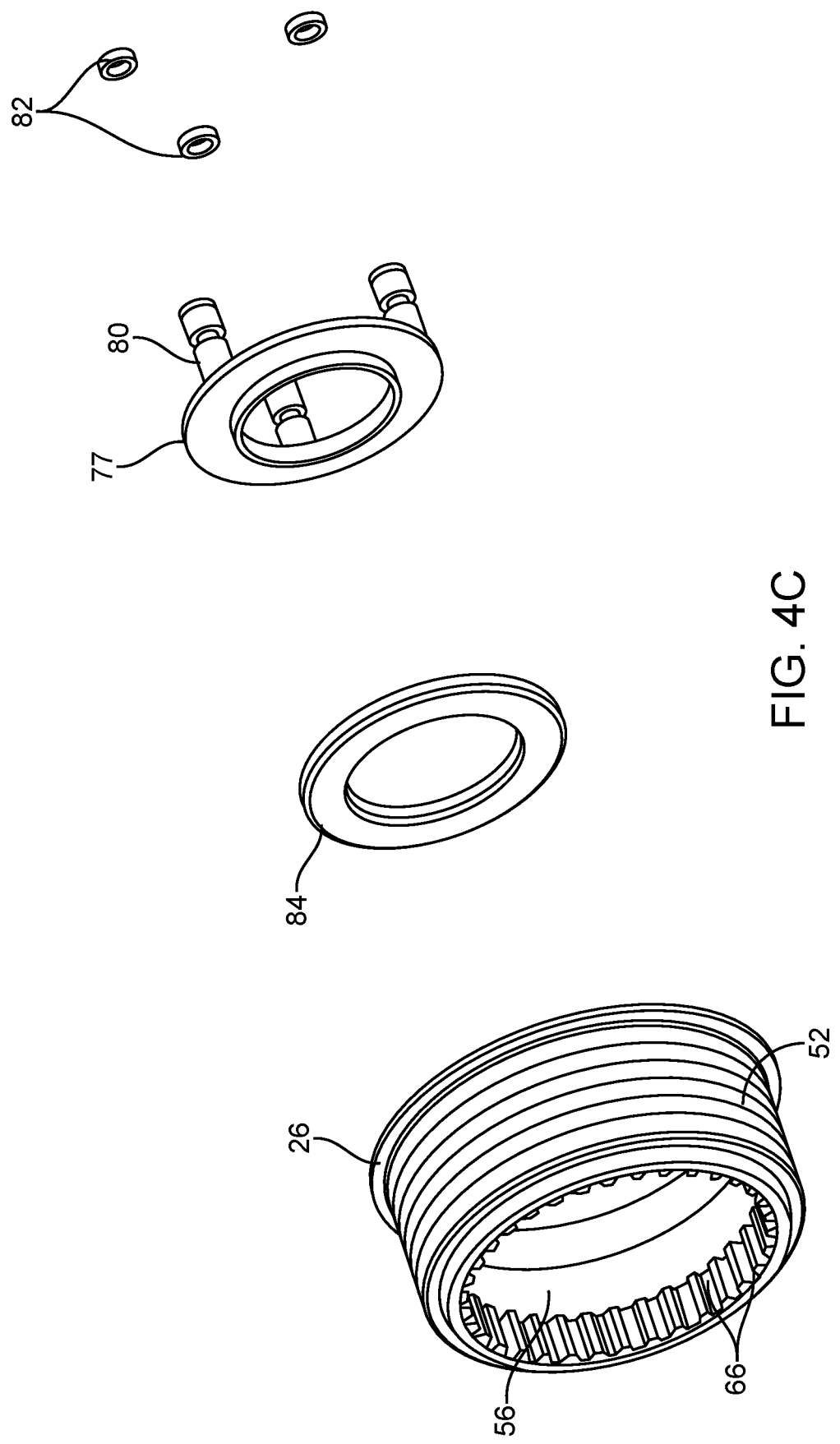

The slider gear 72 is axially translatable between an engaged or torque transfer position and a disengaged or torque cut-off position. In the engaged or torque transfer position, as shown in FIG. 3A, the slider gear splines 74 meshingly engage the AC sheave splines 70 as well as the CS sheave splines 66, and the stroke is such that the slider gear dog teeth 76 intermesh with the CS sheave dog teeth 60, thereby operatively connecting the AC sheave 28 and the CS sheave 26 to each other. In the disengaged or torque cut-off position, as shown in FIG. 3B, the slider gear splines 74 and dog teeth 76 do not engage the CS sheave splines 66 and dog teeth 60, respectively; the slider gear splines 74 meshingly engage only the AC sheave pulley splines 70, and thus the AC sheave 28 and the CS sheave 26 are operatively disconnected from each other. In summary, the slider gear splines 74 continuously intermesh with the AC sheave splines 70 and the slider gear splines 74 and dog teeth 76 selectively or intermittingly intermesh the CS sheave splines 66 and dog teeth 60.

In the foregoing manner, the MGU pulley assembly 20 incorporates an integrated clutch mechanism to selectively operatively connect or disconnect two sheaves mounted about the same shaft.

It will be appreciated that in alternative embodiments a reverse arrangement can be realized wherein the slider gear splines intermesh continuously with the CS sheave splines and selectively or intermittingly mesh with the AC sheave splines. In such an embodiment dog teeth can be formed on the opposite axial edge of the slider gear and dog teeth can be provided on the AC sheave for mating engagement with the slider gear dog teeth when the slider gear splines engage the AC sheave splines.

If desired, the dog teeth may be omitted entirely such that torque transfer occurs only through the sheaves' splines.

Alternatively, the splines on the CS sheave (or AC sheave in the alternative embodiment) may be omitted such that torque transfer occurs only through the dog teeth.

Figure 6B:
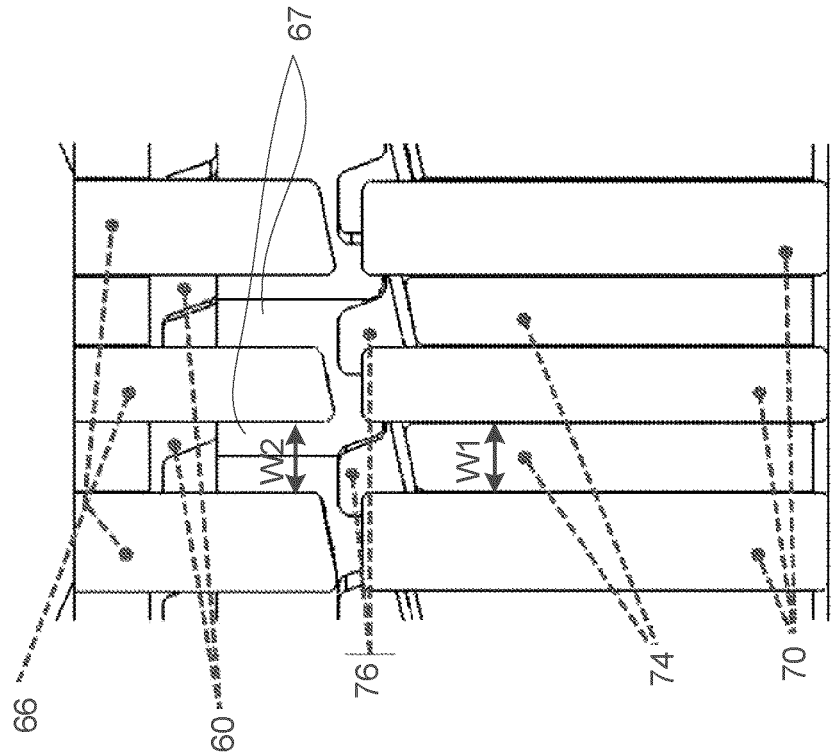
FIGS. 6A and 6B are detail plan views of gear engagement profiles in the MGU pulley assembly when it is in the engaged and disengaged positions, respectively.
Figure 6A:
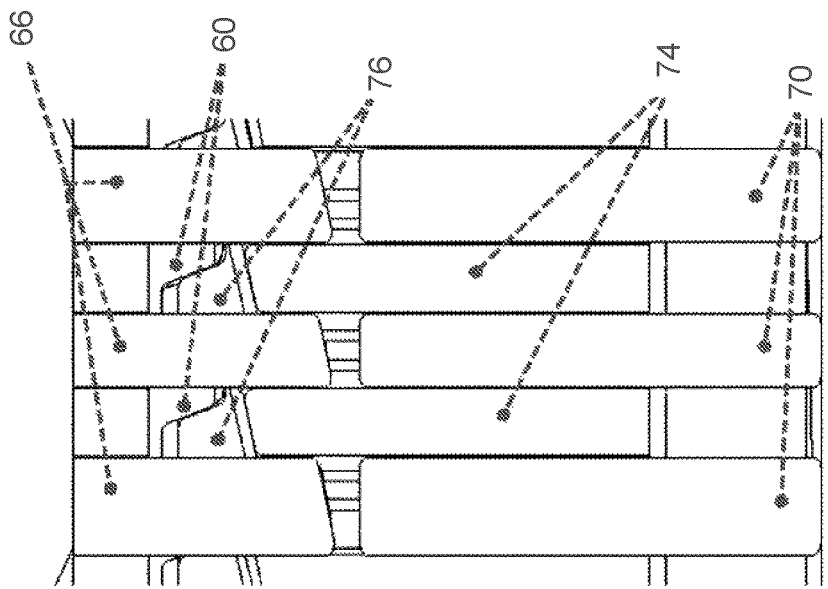

However, provisioning the splines 66, 70, 74 and dog teeth 60, 76 offers certain advantages in reducing noise of engagement and noise while engaged. Referring additionally to the detail plan view of FIGS. 6A and 6B, it will be seen that each of the CS sheave dog teeth 60 are slanted relative to the axial direction and each of the slider gear dog teeth 76 are correspondingly slanted relative to the axial direction. The slider gear splines 74 have circumferential extents W1 that are slightly smaller than circumferential extents W2 of receiving slots 67 between the CS sheave splines 66, i.e., there is some play between these elements. As the slider gear splines 74 enter the CS sheave receiving slots 67, the complimentary slants of the slider gear dog teeth 76 and the CS sheave dog teeth 60 wedge the slider gear splines 74 against one side of the CS sheave splines 66, which helps to reduce impact noise. Thus, the dog teeth 60 and 76 can be considered as wedge members, and it will be appreciated that a similar effect can be realized with at least one wedge member provisioned on the slider gear 72 and at least one complementary wedge member provisioned on the CS sheave 26. By wedging the slider gear 72 against the CS sheave 26, it is possible to reduce vibratory noise that arises from torsional vibrations present in the accessory drive system due to instantaneous torque variations transmitted by the crankshaft, which tend to induce a to and fro or vibratory motion between the slider gear 72 and the CS sheave 26.

As shown in the illustrated embodiment, a plunger ring 77 can be slidably mounted to the CS sheave hub portion 54 to effect translation of the slider gear 72 between its engaged and disengaged positions. The hub portion 54 can feature a plurality of circumferentially spaced, axially orientated passageways 78 and the plunger ring 77 can have a corresponding plurality of axially extending legs 80 installed into respective passageways 78 for slidably mounting the plunger ring 77 to the hub portion 54. O-ring seals 82 can be installed on the legs 80 to inhibit transfer of grease or dirt. A thrust washer 84 can be disposed between the plunger ring 77 and the slider gear 72. A spring 85 can be disposed between the slider gear 72 and the AC sheave radially orientated wall 44 to bias the slider gear 72 to the engaged position.

Figure 7:
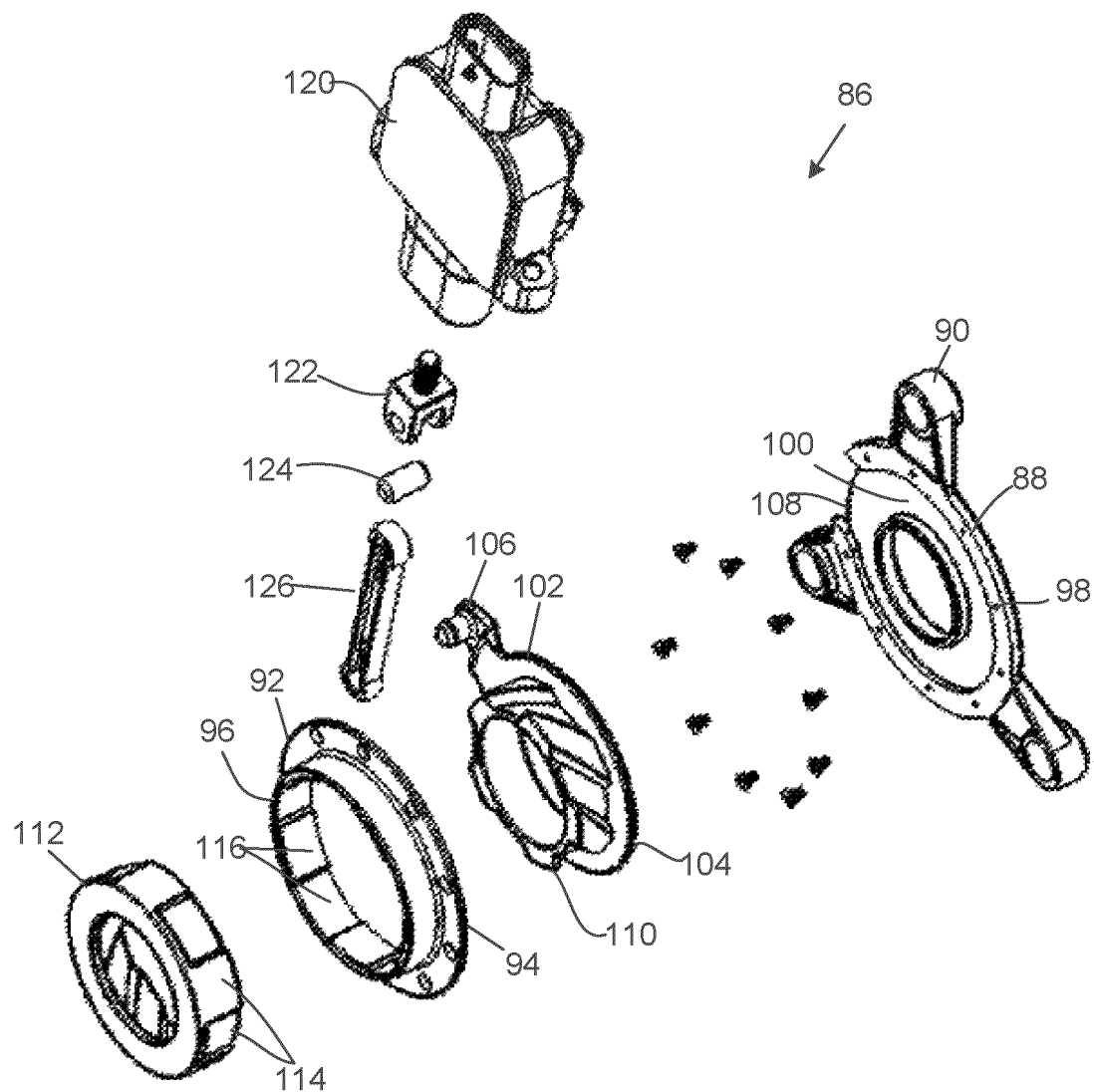
FIG. 7 is an exploded view of an actuator employed in the MGU pulley assembly shown in FIGS. 3-5.
Figure 8:
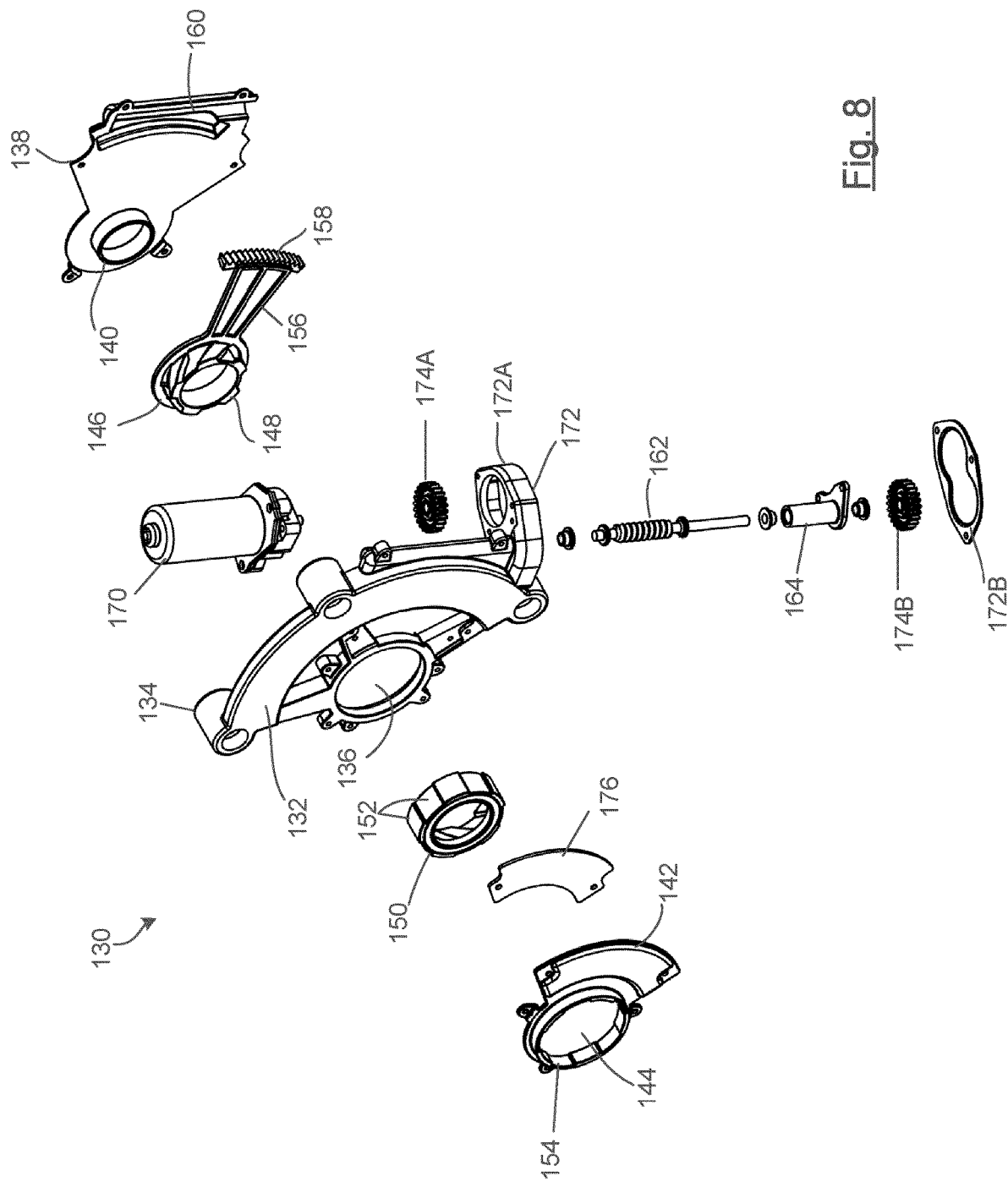
FIG. 8 is an exploded view of an alternative actuator that can be utilized in the MGU pulley assembly.

The plunger ring 77 can be considered as a portion of an actuator which provides a means for translating the slider gear 72 between its engaged and disengaged positions. Referring additionally to the partial exploded view in FIG. 7, one example of an actuator 86 is shown in the illustrated embodiment. This actuator 86 includes a housing 88 mountable to the casing of the MGU 14, for example, via mounting legs 90. An actuator guide flange 92 having a radial plate portion 94 and an axial stub portion 96 is mounted to the housing via the plate portion 94. The plate portion 94 is fitted on a raised lip 98 of the housing 88 so as to define an arcuate slot 100. A driver screw 102 has a plate portion 104 slidably mounted in the arcuate slot 100. The plate portion 104 has an arm 106 which extends from a window 108 formed in the lip 98 such that the driver screw 102 is rotatable over a limited rotational angle. The driver screw 102 has a threaded axial or screw portion 110 which meshes with a complimentarily threaded nut driver 112. The nut driver 112 is splined on an exterior circumferential wall 114 and the guide flange axial stub portion 96 is complimentarily splined on an interior circumferential wall 116 so as to preclude rotation of the nut driver 112 and induce axial translation of the nut driver 112 when the driver screw 102 is rotated.

The driver screw 102 can be rotated by a linear actuator 120 coupled to the driver screw arm 106 by a linkage, for example, by a coupling 122, pin 124, and actuator arm 126.

From the foregoing it will be seen that activating the linear actuator 120 in a first direction will rotate the driver screw 102, which, in turn, causes the nut driver 112 to translate axially and push the plunger ring 77 and slider gear 72 axially to the engaged position, overcoming the bias force provided by the return spring 85. Activating the linear actuator 120 in a second direction, opposite the first direction, causes the driver screw 102 to rotate in the opposite direction, which causes the nut driver 112 to translate axially in a reverse direction, allowing the return spring 85 to push the slider gear 72 and plunger ring 77 in the reverse direction to the disengaged position.

Another example of an actuator 130 is shown in FIGS. 8-11. This actuator 130 includes a bracket 132 mountable to the casing of the MGU 14, for example, via mounting legs 134. The bracket 132 has a circular opening 136. A rear housing portion 138 is mounted to the bracket 132. The rear housing portion includes a cylindrical projection 140 concentrically fitted into the circular opening 136. A front housing portion 142 is also mounted to the bracket 132. The front housing portion 142 has a circular opening 144 concentrically arranged about the circular opening 136. A driver screw 146 is rotatably mounted about the cylindrical projection 140. The driver screw 146 has a threaded axial or screw portion 148 which meshes with a complimentarily threaded nut driver 150. The nut driver 150 is splined on an exterior circumferential wall 152 and the front housing portion 142 is complimentarily splined on an interior circumferential wall 154 that defines the circular opening 144 so as to preclude rotation of the nut driver 150 and induce axial translation of the nut driver 150 when the driver screw 146 is rotated.

In this actuator 130, the driver screw 146 features a radial arm 156 that terminates with a sector gear 158. The sector gear 158 is disposed in an arcuate slot 160 provided in the rear housing 138, thus limiting angular travel of the driver screw 146. The sector gear 158 meshes with a worm gear 162 that is rotatably disposed in an alignment collar 164 fixed to the bracket 132. A motor 170 drives the worm gear 162 via a gear box 172 mounted to the bracket 132. The gear box 172, provisioned by container 172A and cover 172B, houses reduction gears 174A, 174B that are operatively connected to the motor 170 and worm gear 162, respectively. For compact packaging arrangement, the worm gear 162 can be disposed underneath the motor 170 with the worm gear rotational axis lying parallel to the motor rotational axis and the reduction gears 174A, 174B being installed to facilitate such an axis-shifting arrangement.

A controller printed circuit board (PCB) can be installed between the front housing portion 142 and the bracket 132.

From the foregoing it will be seen that activating the motor 170 in a first direction will drive the worm gear 162, which drives the sector gear 158, causing the driver screw 146 to rotate, which, in turn, causes the nut driver 150 to translate axially and push the plunger ring 77 and slider gear 72 axially to the engaged position. Activating the motor 170 in a second direction, opposite the first direction, causes the driver screw 146 to rotate in the opposite direction, which causes the nut driver 150 to translate axially in a reverse direction, allowing the return spring 85 to push the slider gear 72 and plunger ring 77 in the reverse direction to the disengaged position.

Figure 12:
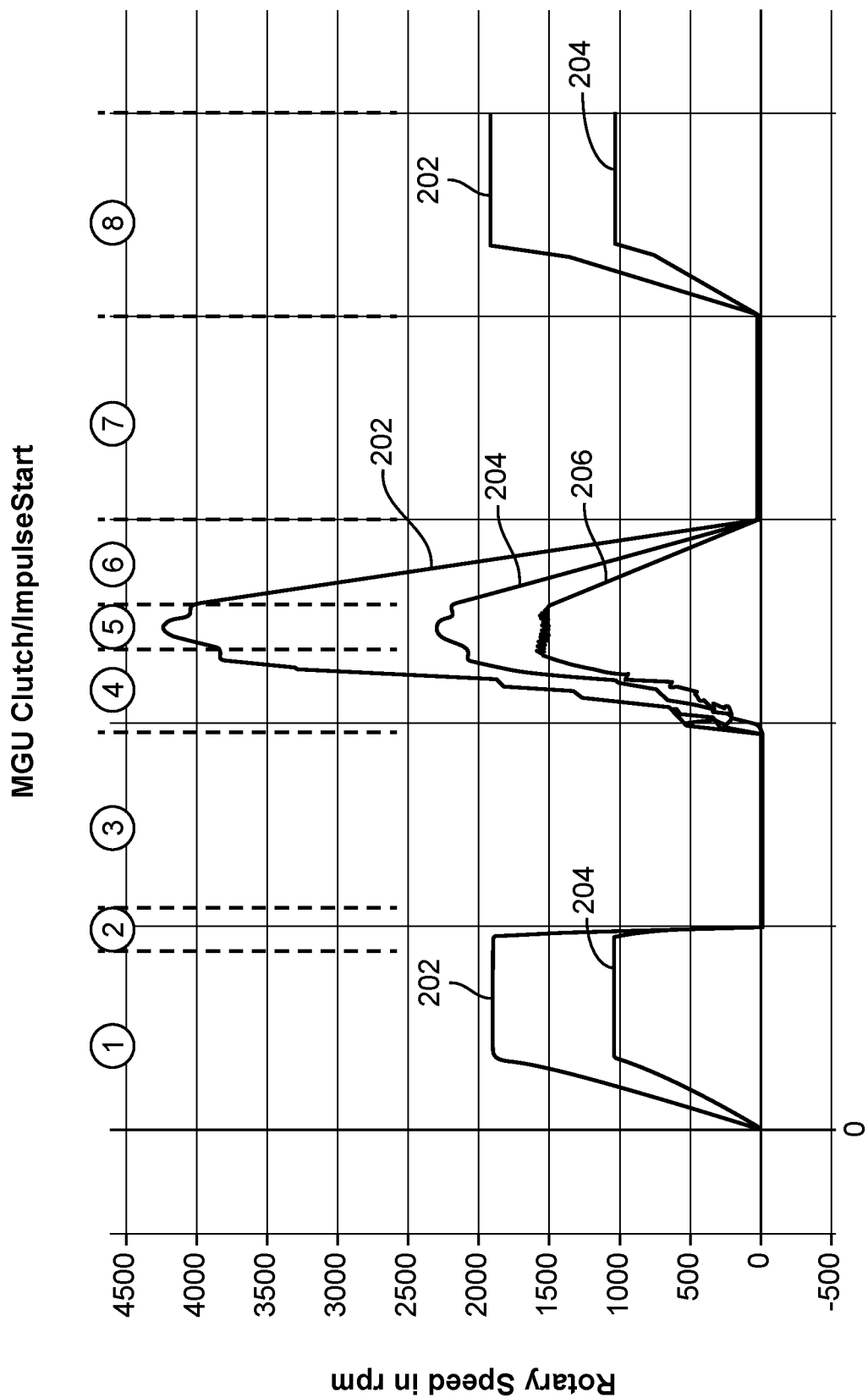
FIG. 12 is a graph showing rotational speeds of various components of the accessory drive system as the MGU pulley assembly integrated clutch mechanism changes state to vary operating modes of the accessory drive system.

In typical operation, the actuation of the integrated clutch mechanism of the MGU pulley assembly 20 occurs when the rotational speed of the MGU 14 is minimal and preferably zero. Thus to change state from any of the normal, hybrid start, boost and/or regen modes to the stand cooling mode, or vice versa, the speed of the MGU 14 is preferably reduced to zero before the integrated clutch mechanism is actuated, the integrated clutch mechanism is actuated, and then the MGU 14 is returned to operating speed. An example of such a sequence is shown in FIG. 12, wherein plot 202 represents the rotational speed of the MGU 14, plot 204 represents the rotational speed of the AC pulley 22, and plot 206 represents the rotational speed of the CS pulley 18. In state (1), the system 10 is in the stand cooling mode. In state (2), the MGU 14 speed is reduced to zero. In state (3) the integrated clutch mechanism is actuated, the slider gear 72 being actuated to the engaged or torque transfer position from the disengaged or torque cut-off position. This transition can occur in a short time frame; for example the actuator 130 can be constructed to effect the transition in under 150 milliseconds. In state (4) the system 10 is in the hybrid start mode. In state (5) the system 10 is in the normal (ICE on) mode. In state (6) the system 10 is in the regen mode, where the ICE 12 is shut down and the vehicle is brought to a standstill, at which point the MGU speed nears zero. In state (6) the integrated clutch mechanism is actuated, the slider gear 72 being actuated to the disengaged or torque cut-off position from the engaged or torque transfer position. In state (8) the system 10 returns to the stand cooling mode.

It should also be appreciated that it is not absolutely necessary to reduce the MGU speed to zero before actuating the integrated clutch mechanism of the MGU pulley assembly 20. This could be beneficial in some situations, for example, to enter into the enhanced cooling mode without first stopping the ICE 12. In such situations, a dynamic engagement or disengagement of the integrated clutch mechanism can be realized by equivalent speed (taking into account pulley ratios) and, optionally, torque matching. For dynamic disengagement, the MGU 14 can be operated to substantially equivalently match the rotational speed and torque of the ICE 12, it being understood that the term "equivalent" means speeds that take into account any difference in diameter between the CS pulley 18 and the CS sheave 26, as would be understood by those skilled in the art. This reduces the normal force on the splines 66, 70, 74 because torque transfer is reduced, and thus the frictional force acting on the slider gear 72 is reduced. Similarly, for dynamic engagement, the MGU 14 can be operated to substantially equivalently match the speed and the torque of the ICE 12, it being understood that the term "equivalent" means speeds that take into account any difference in diameter between the CS pulley 18 and the CS sheave 26. At this point the actuator 86 or 130 can retract, allowing the return spring 85 to push the slider gear 72 to engage with the CS sheave 26. A small speed or torque delta in the boost direction will allow the slider gear splines 74 to seat fully in the CS sheave spline receiving slots 67.

Figure 13A:
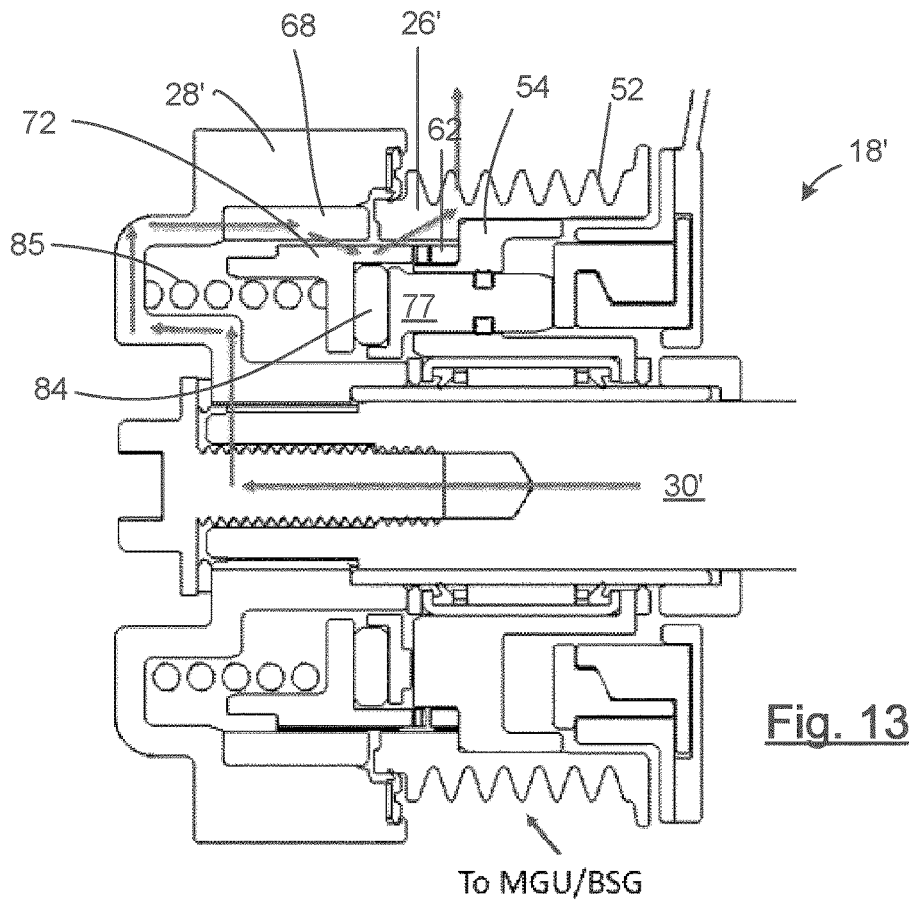
Figure 13B:
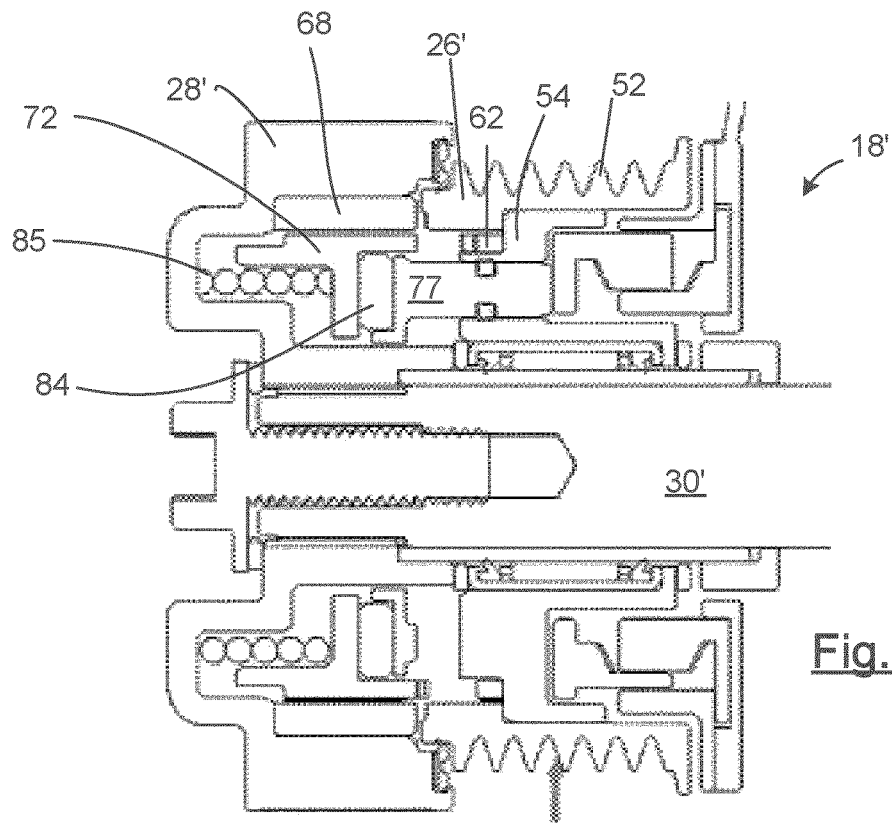

In an alternative embodiment, shown in FIGS. 13A and 13B, a CS pulley assembly 18' can integrate a clutch mechanism of the type described above. In this embodiment, the CS pulley assembly 18' has a first rotary drive member 26' with an endless drive member power transmitting surface such as V-shaped grooves 52 and a second rotary drive member 28' that does not require an endless drive member power transmitting surface. The internal components of the CS pulley 18' are substantially the same as the MGU pulley assembly 20 and thus like parts bear like reference numerals. In this embodiment, however, the first and second rotary drive members 26' and 28' are supported on a crankshaft shaft 30' instead of the MGU shaft 30. For the normal, hybrid start, boost and/or regen modes the slider gear 72 can be disposed in the engaged or torque transfer position, as seen in FIG. 13A, so that the first and second rotary drive member 26' and 28' are operatively connected to each other. For the stand cooling mode, the slider gear 72 can be disposed in the disengaged or torque cut-off position, as seen in FIG. 13B, so that the first and second rotary drive members 26' and 28' are operatively disconnected from each other. It will be appreciated that in an accessory drive system utilizing the CS pulley assembly 18' a single endless drive member such as a poly-V belt can be deployed to interconnect the first rotary drive member 26', a single pulley (not shown) connected to the MGU shaft 30, and the AC pulley 22.

While the endless drive members are shown herein as asynchronous poly-V belts, the endless drive members can be any other type of asynchronous or synchronous rotary power transmitting member. For example, another type of asynchronous rotary power transmitting member is a flat belt. Examples of synchronous rotary power transmitting members include timing belts or chains. In these alternative cases the sheaves as shown herein would replaced with the complimentary rotary drive members such as sprockets or gears. The term "rotary drive member" is thus intended to include a pulley, sheave, sprocket, or gear that interacts with an endless drive member or an intermediate rotary member that is rotatingly driven by a shaft.

In addition, while the driven accessory shown and discussed above has been the air conditioning compressor, it will be appreciated that the driven accessory can be another unit, for example, a compressor for a heat pump.

Those skilled in the art will appreciate that the embodiments disclosed herein can be modified or adapted in various other ways whilst still keeping within the scope of the appended claims.

| Parts List | |
|---|---|
| 10 | accessory drive system |
| 12 | ICE |
| 14 | MGU |
| 16 | AC Unit |
| 18 | CS pulley |
| 20 | MGU pulley assembly |
| 22 | AC pulley |
| 24A, 24B | belt |
| 26 | CS sheave |
| 28 | AC sheave |
| 30 | MGU shaft |
| 31 | collar |
| 32 | AC sheave, toothed bore |
| 33 | shaft sleeve |
| 34 | MGU shaft toothed circumference |
| 36 | MGU shaft, threaded bore |
| 38 | lock nut |
| 40 | washers |
| 42 | AC sheave, V-shaped grooves |
| 44 | AC sheave, radially orientated wall |
| 46 | AC Sheave, toroidal space |
| 52 | CS sheave, V-shaped grooves |
| 54 | CS sheave, hub portion |
| 56 | cylindrical body |
| 57 | roller bearing |
| 58 | thrust washer |
| 60 | CS sheave, dog teeth |
| 62 | wedge ring |
| 64 | wedge ring teeth |
| 66 | CS sheave splines |
| 67 | CS sheave, spline receiving slots |
| 68 | spline ring |
| 70 | splines |

-continued

Parts List

| | |
|---|---|
| 72 | slider gear |
| 74 | slider gear spines |
| 76 | slider gear dog teeth |
| 77 | plunger ring |
| 78 | axially orientated passageways |
| 80 | plunger ring legs |
| 82 | O-rings |
| 84 | thrust washer |
| 85 | spring |
| 86 | actuator |
| 88 | housing |
| 90 | mounting legs |
| 92 | actuator guide flange |
| 94 | actuator guide flange, radial plate portion |
| 96 | actuator guide flange, axial stub portion |
| 98 | housing, raised lip |
| 100 | arcuate slot |
| 102 | driver screw |
| 104 | driver screw plate portion |
| 106 | driver screw arm |
| 108 | window |
| 110 | driver screw, screw portion |
| 112 | nut driver |
| 114 | nut driver exterior circumferential wall |
| 116 | guide flange axial stub portion interior circumferential wall |
| 120 | linear actuator |
| 122 | coupling |
| 124 | pin |
| 126 | actuator arm |
| 130 | actuator |
| 132 | bracket |
| 134 | mounting legs |
| 136 | bracket circular opening |
| 138 | rear housing portion |
| 140 | rear housing portion cylindrical projection |
| 142 | front housing portion |
| 144 | front housing portion circular opening |
| 146 | driver screw |
| 148 | driver screw threaded axial or screw portion |
| 150 | nut driver |
| 152 | nut driver exterior circumferential wall |
| 154 | front housing portion interior circumferential wall |
| 156 | driver screw radial arm |
| 158 | sector gear |
| 160 | rear housing arcuate slot |
| 162 | worm gear |
| 164 | alignment collar |
| 170 | motor |
| 172 | gear box |
| 174A, 174B | reduction gears |
| 176 | controller printed circuit board |
| 18' | CS pulley assembly |
| 26' | first rotary drive member |
| 28' | second rotary drive member |
| 30' | crankshaft shaft |

What is claimed is:

1. A pulley assembly for an accessory drive system of an internal combustion engine, the pulley assembly comprising:
a first rotary drive member configured to be rotatably supported on a shaft of a rotary power device, wherein the first rotary drive member has a first set of spline teeth thereon and the first rotary drive member is rotatable about a rotational axis;
a second rotary drive member configured to be fixed to the shaft, wherein the second rotary drive member has a second set of spline teeth thereon and the second rotary drive member is rotatable about the rotational axis;
a slider gear disposed for rotation about the rotational axis, wherein the slider gear has a set of slider gear spline teeth thereon and the slider gear is axially moveable between a torque cut-off position and a torque transfer position, wherein, in the torque cut-off position the slider gear spline teeth intermesh with the spline teeth of one of the first and second rotary drive members but not the other of the first and second rotary drive members, thereby operatively disconnecting the first and second rotary drive members from each other, and wherein, in the torque transfer position the slider gear spline teeth simultaneously intermesh with the spline teeth of both the first and second rotary drive members, thereby operatively connecting the first and second rotary drive member to each other; and
an actuator, mountable to the rotary power device, and connected to the slider gear to drive the slider gear axially to between the torque transfer position and the torque cut-off position.

2. A pulley assembly according to claim 1, wherein the first rotary drive member is mounted on a bearing configured to be mounted to the shaft, whereby the first rotary drive member is independently rotatable relative to the shaft.

3. A pulley assembly according to claim 2, wherein:
the slider gear has at least one slider gear wedge member; and
the other of the first and second rotary drive members has at least one wedge member that is shaped complimentarily to the shape of the slider gear wedge member;
wherein movement of the slider gear to the torque transfer position brings the at least one slider gear wedge member into sliding engagement with the at least one wedge member of the other of the first and second rotary drive members and in the process of such engagement a first side of the slider gear spline teeth becomes wedged against a first side of the spline teeth of the other of the first and second rotary drive members.

4. A pulley assembly according to claim 3, wherein the actuator includes a bias spring for urging the slider gear towards the torque transfer position.

5. A pulley assembly according to claim 4, wherein the actuator includes:
a plunger ring concentrically mounted about the shaft, the plunger ring including at least one leg extending in an axial direction, wherein the other of the first and second rotary drive members includes at least one axial passageway in which the at least one leg is disposed, the plunger ring being axially slidable relative to the other of the first and second rotary drive members so as to drivingly engage the slider gear; and
a driver screw concentrically mounted about the shaft for independent rotation relative to the shaft;
a nut driver concentrically mounted about the shaft and operatively connected to the driver screw, the nut driver being constrained from rotation so as to translate axially when the driver screw rotates and engage the plunger ring; and
means for rotating the driver screw.

6. An accessory drive system for an internal combustion engine, comprising:
a crankshaft pulley mounted to an engine crankshaft;
a compressor pulley mounted to a compressor shaft;
a pulley assembly mounted to a motor-generator unit (MGU) shaft, the pulley assembly including
a first sheave rotatably mounted via a bearing to the MGU shaft so as to be rotatable independent of the MGU shaft, the first sheave having a first set of spline teeth thereon, a second sheave fixed to the MGU shaft so as to rotate therewith, wherein the second sheave has a second set of spline teeth thereon, a slider gear disposed for rotation about the MGU shaft, wherein the slider gear has a set of slider gear spline teeth thereon and the slider gear is axially moveable between a torque cut-off position and a torque transfer position, wherein, in the torque cut-off position the slider gear spline teeth intermesh with the second sheave spline teeth but not the first sheave spline teeth, thereby operatively disconnecting the first and second sheaves from each other, and wherein, in the torque transfer position the slider gear spline teeth simultaneously intermesh with the second sheave spline teeth and the first sheave spline teeth, thereby operatively connecting the first and second sheaves to each other, and an actuator, mountable to an MGU, and connected to the slider gear to drive the slider gear axially between the torque transfer position and the torque cut-off position;

a first endless drive member interconnecting the crankshaft pulley and the first sheave; and a second endless drive member interconnecting the compressor pulley and the second sheave.

7. A system according to claim 6, wherein:

the slider gear has at least one slider gear wedge member; and the first sheave has at least one wedge member that is shaped complimentarily to the shape of the slider gear wedge member;

wherein movement of the slider gear to the torque transfer position brings the at least one slider gear wedge member into sliding engagement with the at least one first sheave wedge member and in the process of such engagement a first side of the slider gear spline teeth becomes wedged against a first side of the first sheave spline teeth.

8. A system according to claim 7, wherein the actuator includes a bias spring for urging the slider gear towards the torque transfer position.

9. A system according to 8, wherein the actuator includes:

a plunger ring concentrically mounted about the MGU shaft, the plunger ring including at least one leg extending in an axial direction, wherein the first sheave includes at least one axial passageway in which the at least one leg is disposed, the plunger ring being axially slidable relative to the first sheave so as to drivingly engage the slider gear;

a driver screw concentrically mounted about the MGU shaft for independent rotation relative to the MGU shaft;

a nut driver concentrically mounted about the MGU shaft and operatively connected to the driver screw, the nut driver being constrained from rotation so as to translate axially when the driver screw rotates and engage the plunger ring; and means for rotating the driver screw.

10. A system according to claim 6, including a compressor and an MGU, wherein the MGU is operated at a rotational speed substantially equivalent to the rotational speed of the crankshaft immediately prior to changing the position of the slider gear.

11. A system according to claim 6, including a compressor and an MGU, wherein the accessory drive system can be operated in a stand cooling mode in which the slider gear is positioned in the torque cut-off position, the engine is not operating and the crankshaft pulley is not rotating, and the MGU is operating to power the compressor via the second endless drive member.

12. A system according to claim 6, including a compressor and an MGU, wherein the accessory drive system can be operated in an enhanced cooling mode in which the engine is operating at idle and the crankshaft pulley is rotating at idle speed, the slider gear is positioned in the torque cut-off position, and the MGU is operating to power the compressor via the second endless drive member.

13. An accessory drive system for an internal combustion engine, comprising:

an MGU pulley mounted to the shaft of a motor-generator (MGU) unit;

a compressor pulley mounted to a compressor shaft;

a pulley assembly mounted to a crankshaft of an engine, the pulley assembly including a sheave rotatably mounted via a bearing to the crankshaft so as to be rotatable independent of the crankshaft, the sheave having a first set of spline teeth thereon, a rotary drive member fixed to the crankshaft so as to rotate therewith, wherein the rotary drive member has a second set of spline teeth thereon, a slider gear disposed for rotation about the crankshaft, wherein the slider gear has a set of slider gear spline teeth thereon and the slider gear is axially moveable between a torque cut-off position and a torque transfer position, wherein, in the torque cut-off position the slider gear spline teeth intermesh with the rotary drive member spline teeth but not the sheave spline teeth, thereby operatively disconnecting the sheave and the rotary drive member from each other, and wherein, in the torque transfer position the slider gear spline teeth simultaneously intermesh with the rotary drive member spline teeth and the sheave spline teeth, thereby operatively connecting the rotary drive member and the sheave to each other, and an actuator connected to the slider gear to drive the slider gear axially between the torque transfer position and the torque cut-off position; and a endless drive member interconnecting the sheave, the MGU pulley and the compressor pulley.

14. A system according to claim 13, wherein:

the slider gear has at least one slider gear wedge member; and the sheave has at least one wedge member that is shaped complimentarily to the shape of the slider gear wedge member;

wherein movement of the slider gear to the torque transfer position brings the at least one slider gear wedge member into sliding engagement with the at least one sheave wedge member and in the process of such engagement a first side of the slider gear spline teeth becomes wedged against a first side of the sheave spline teeth.

15. A system according to 14, wherein the actuator includes:

a bias spring for urging the slider gear towards the torque transfer position;

a plunger ring concentrically mounted about the crankshaft, the plunger ring including at least one leg extending in an axial direction, wherein the sheave includes at least one axial passageway in which the at least one leg is disposed, the plunger ring being axially slidable relative to the sheave so as to drivingly engage the slider gear;

a driver screw concentrically mounted about the crankshaft for independent rotation relative to the crankshaft;

a nut driver concentrically mounted about the crankshaft and operatively connected to the driver screw, the nut driver being constrained from rotation so as to translate axially when the driver screw rotates and engage the plunger ring; and means for rotating the driver screw.

\* \* \* \* \*